United States Patent [19]
Rao et al.

[11] Patent Number: 5,632,009
[45] Date of Patent: May 20, 1997

[54] METHOD AND SYSTEM FOR PRODUCING A TABLE IMAGE SHOWING INDIRECT DATA REPRESENTATIONS

[75] Inventors: Ramana B. Rao, San Francisco; Stuart K. Card, Los Alto Hills, both of Calif.

[73] Assignee: Xerox Corporation, Stamford, Conn.

[21] Appl. No.: 611,013

[22] Filed: Mar. 5, 1996

Related U.S. Application Data

[63] Continuation of Ser. No. 123,496, Sep. 17, 1993, abandoned.
[51] Int. Cl.$^6$ .................................................. G06F 15/00
[52] U.S. Cl. .................................................................. 395/770
[58] Field of Search ........................ 395/118–20, 140–1, 395/146, 157–8, 161, 164

[56] References Cited

U.S. PATENT DOCUMENTS

| | | | |
|---|---|---|---|
| 5,093,907 | 3/1992 | Hwong | 395/152 |
| 5,179,646 | 1/1993 | Kawakami et al. | 395/145 |
| 5,226,118 | 7/1993 | Baker et al. | 395/161 |
| 5,228,119 | 7/1993 | Mihalisin | 395/118 |
| 5,230,040 | 7/1993 | Yamashita | 395/148 |
| 5,231,577 | 7/1993 | Koss | 364/419 |
| 5,255,363 | 10/1993 | Seyler | 395/164 |
| 5,257,349 | 10/1993 | Alexander | 395/159 |
| 5,317,686 | 5/1994 | Salas et al. | 395/157 |
| 5,333,244 | 7/1994 | Harashima | 395/119 |
| 5,396,621 | 3/1995 | MacGregor et al. | 395/161 |
| 5,485,567 | 1/1996 | Banning et al. | 395/148 |

FOREIGN PATENT DOCUMENTS

| | | |
|---|---|---|
| 0399663A1 | 11/1990 | European Pat. Off. . |
| 0447095A3 | 9/1991 | European Pat. Off. . |
| 0619549A1 | 10/1994 | European Pat. Off. . |
| 2139846 | 11/1984 | United Kingdom . |
| WO91/04541 | 4/1991 | WIPO . |

OTHER PUBLICATIONS

Mihalisin, Ted, et al., "Using Hierarchical Graphics to Visually Analize 'Serial' and 'Cerreal' Data," Publication Date and Source Unknown.

Mihalisin, Ted, Schwegler, J, and Timlin, J., "Hierarchical Multivariate Visualization," in Computer Science and Statistics: Proceedings of the 24th Symposium on the Interface, 1992, pp. 141–149.

(List continued on next page.)

*Primary Examiner*—Heather R. Herndon
*Assistant Examiner*—Rudolph Buchel
*Attorney, Agent, or Firm*—Judith C. Bares

[57] ABSTRACT

A method for operating a processor-controlled system produces a table image including graphical display objects in each of the cell regions indirectly representing the data values in an underlying n-dimensional (nD) information data array. Request signal data is received from a input signal source to present the table image in the display area of a display device connected to the processor-controlled system. In response to the request signal data, for each cell in the table image, the source data value and data type of a source data item in the nD data array is obtained, and a cell presentation type is selected using the data type. A graphical display object having at least one display feature representative of the data type of the data value is produced from the cell presentation type, and image definition data defining table image and the graphical display object for each cell is provided to a system display device for display. The underlying data in the nD data array is thus graphically and indirectly represented in the table image, facilitating the visual inspection and identification of patterns and trends in the data. In addition, for very large conventional table images that do not fit in a standard sized display area, indirect representation of the data occupies substantially less space in the display area, permitting very large tables to be entirely represented graphically in one image. A sophisticated user interface permits a system user to perform table manipulation functions, such as reordering rows and column, sorting rows or columns, and deriving new rows or column, in order to further reveal data trends and patterns in the graphical representations.

26 Claims, 20 Drawing Sheets

OTHER PUBLICATIONS

J. D. Mackinlay, G. G. Robertson, and S. K. Card, "The perspective wall: Dental and context smoothly integrated", *Proceedings of the ACM SIGCHI Conference on Human Factors in Computing Systems*, ACM, Apr. 1991, pp. 173–179.

George W. Furnas, "Generalized Fisheye Views", *Proceedings of the ACM SIGCHI Conference on Human Factors in Computing Systems*, Apr. 1986, ACM, pp. 16–23.

Manojit Sarkar and Marc H. Brown, "Graphical Fisheye Views of Graphs", *Proceedings of the ACM SIGCHI Conference on Human Factors in Computing Systems*, Apr. 1992, ACM, pp. 83–91.

Bertin, Jacques, *Semiology of Graphics*, University of Wisconson Press, 1983, translated by W. J. Berg, pp. v–xi, 1–13, 191–231, 254–268.

William S. Cleveland, *The Elements of Graphing Data*, Wadsworth Advanced Books and Software, Monterey California, 1985, pp. x–xii, 1–2, 208–218, 229–240.

Robert Spence and Mark Apperley, "Database Navigation: An Office Environment for the Professional", *Behavior and Information Technology*, 1982, pp. 43–54.

Bertin, "Semiology of Graphs", Univ of Wisonsin Press (1983).

460

Column Dialog: Team

[Apply] [Accept] [Cancel]

Name: Team
Type: Nil

Graphical Mapping

Number of Colors: | 1 | 2 | 3 | 4 | 5 | 6 | 7 | 8 |

How: | None | One | Some | All |

Values:

| Cle. | Hou. | Sea. | Mon. | Oak. |
|------|------|------|------|------|
| K.C. | Atl. | Det. | L.A. | St.L. |
| Bal. | Pit. | Min. | Cin. | S.D. |
| Chi. | Cal. | S.F. | Bos. | N.Y. |
| Mil. | Tor. | Tex. | Phi. | |

Spotlight

How: | None | One | Some |

Values:

| Cle. | Hou. | Sea. | Mon. | Oak. |
|------|------|------|------|------|
| K.C. | Atl. | Det. | L.A. | St.L. |
| Bal. | Pit. | Min. | Cin. | S.D. |
| Chi. | Cal. | S.F. | Bos. | N.Y. |
| Mil. | Tor. | Tex. | Phi. | |

*Fig. 17*

METHOD AND SYSTEM FOR PRODUCING A TABLE IMAGE SHOWING INDIRECT DATA REPRESENTATIONS

CROSS REFERENCE TO OTHER APPLICATIONS

The present application is a continuation of Ser. No. 08/123,496, filed Sep. 17, 1993, now abandoned.

The present invention is related to another invention that is the subject matter of a concurrently filed, commonly assigned U.S. patent application, Ser. No. 08/123,174, now abandoned, entitled "Method and System for Producing a Table Image Having Focus and Context Areas Showing Direct and Indirect Data Representations", which is hereby incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates generally to the presentation of data in image form in processor-controlled systems, and more particularly to effectively presenting in a tabular image graphical representations of data capable of being structured as an array.

BACKGROUND

A key objective of information systems designers is the presentation of information representing data stored in the memory device of a processor-controlled system to the human user of the system in an effective image format that conveys and enhances the understanding of the information in a spacially efficient and effective manner, and permits the system user to quickly and efficiently specify and locate information of particular interest.

A familiar and effective information presentation form for certain types of structured information is that of an image of a table, also referred to herein as a "table image". As used herein, a "table" is an orderly, rectilinear arrangement of information, typically but not necessarily, ordered in a rectangular form of rows and columns and having identifiers, such as labels, arranged at the periphery of the table. The intersection of a row and column in a table defines a data location, typically called a "cell", and may include alphabetic and numeric character data or arithmetic operators or formulas. A table is distinguishable from various types of graphs which do not have all of the characteristics of the orderly, rectilinear arrangement of information found in a table. A popular application of a table image is the "spreadsheet", the information presentation format used by a computer-implemented spreadsheet application program that presents a tabular image of underlying data stored in the memory of a system, and that provides a system user with access to the stored data via the manipulation of the character display features that visually represent the underlying data presented in the cells of the spreadsheet. Table images also may be used in a wide variety of application program contexts where the information structure includes linear elements and is organized in, or is capable of being organized in, an n-dimensional "array data structure".

A common problem that exists with the presentation of data in a table image format of any size involves the display of character, or non-graphical, display features such as text and numbers, in the table cells representing the data in the information structure. Rows and columns of text and numbers, even when sorted or ordered to reflect a particular information interest of the system user, do not necessarily present the information in the data structure in a form meaningful for detecting patterns in the information, or for seeing overall trends in the data. The ability to detect patterns and trends often facilitates for the system user both navigation through the data and rapid understanding of the key principles that the data conveys.

Another problem specifically involves the presentation of large table images representing a large information structure when there is too much data for all of the data to be clearly presented in a table image that fits in the display area of the system display device. This phenomenon is referred to as the table's wide or extreme aspect ratio. The application program typically only presents a portion of the table image in the display area, and provides a function for the system user to scroll through the table image to reach portions not currently visible in the display area in order to access the data represented by the character images in the table cells. As scrolling brings new cells of the table image into view in the display area, the previously displayed cells, including row and column identifiers such as labels, typically disappear from the display area, and global context information, important for navigating around the table image and for understanding the data that is currently displayed, is lost from the systems user's view. This presentation technique of scrolling through a large table image makes use of what is known as a time strategy for presenting information: the user controls the display of sequential multiple views of the data over a period of time in order to view all of the data.

Two information presentation design strategies are particularly useful for improving the presentation of information and make advantageous use of certain human perceptual abilities in order to maximize rapid and efficient understanding of information presented as an image in the workspace or display area of a display device.

One of these design strategies, which may be called a "space strategy", uses layout and graphic design techniques to present substantially all information in a data structure in one view in the workspace. This strategy typically involves the presentation of information in primarily graphical or pictorial form rather than in non-graphical or character (textual) form because of the size limitations of the workspace of a display device, and because of limitations on the amount of detail that a human user is actually able to perceive.

The other design strategy of interest herein involves the presentation of specific information of particular interest to a system user while concurrently maintaining and displaying the global context and structure of the body of information from which the specific information was selected. The fundamental motivation of this strategy is to provide a balance of local detail and global context. Local detail is needed for the local interactions with the data. The global context is needed to tell the system user what other parts of the data exist and where they are, and may also be important in more effective interpretation of the local detail. One common implementation of this strategy presents the global information in less detail than the local information. This strategy may be considered as a combination of the time and space strategies discussed earlier.

Both of these design strategies are especially important when the data to be presented is part of a large information structure, such as a computer program, a database, a large document structure or collection of documents, or the like. But these design strategies are useful for the presentation of information structures of virtually any size, and subsequent discussions of the application of these strategies in the invention described herein to large information structures is not intended to necessarily limit the invention's application to large data structures.

An example of an application of the information presentation design strategies discussed above may be found in George W. Furnas, "Generalized Fisheye Views", *Proceedings of the ACM SIGCHI Conference on Human Factors in Computing Systems*, April 1986, ACM, pp. 16–23. Furnas discloses the application of "fisheye views" of information to the design of a computer interface for the display of large information structures, presenting a simple formalism for defining a fisheye view based on a "Degree of Interest" (hereafter also referred to as "DOI") function that allows fisheye views to be defined in any sort of information structure where the necessary components of the formalism can be defined. Furnas further discloses that the basic strategy for the display of a large structure uses the degree of Interest function to assign to each point in the information structure a number telling how interested the user is in seeing that point, given the current task. A display of any size, n, can then be made by simply showing the n "most interesting" points as described by the DOI function. Furnas also discloses the definition of fisheye DOI functions for tree structures, and illustrates the fisheye strategy as applied to a calendar showing the current day in "day-at-a-time" detail, the current week in "week-at-a-time" detail, and the rest of the month in "month-at-a-time" detail.

An extension of the fisheye view information presentation strategy to the domain of graphs is disclosed in Manojit Sarkar and Marc H. Brown, "Graphical Fisheye Views of Graphs", *Proceedings of the ACM SIGCHI Conference on Human Factors in Computing Systems*, April 1992, ACM, pp. 83–91. Sarkar and Brown introduce layout considerations into the fisheye formalism, so that the position, size, and level of detail of objects displayed are computed based on client-specified functions of an object's distance from the user's current point of interest, called the "focus", and the object's preassigned importance in the global structure. Sarkar and Brown disclose that the size and detail of a vertex in the fisheye view depends on the distance of the vertex from the focus, a preassigned importance associated with the vertex, and the value of some user-controlled parameters.

Another application of these strategies for presenting information that combines the time and space strategies may be found in J. D. Mackinlay, G. G. Robertson, and S. K. Card, "The perspective wall: Detail and context smoothly integrated", *Proceedings of the ACM SIGCHI Conference on Human Factors in Computing Systems*, ACM, April 1991, pp. 173–179. Mackinlay et al. disclose a technique called the "Perspective Wall" for efficiently visualizing linearly and temporally structured information with wide aspect ratios by smoothly integrating detailed and contextual views. Specialized hardware support for three dimensional (3D) interactive animation is used to fold wide two dimensional (2D) layouts into 3D visualizations that have a center panel for detail and two perspective panels for context, thereby integrating detailed and contextual views into a single workspace display, and allowing the ratio of detail and context to be smoothly adjusted.

Still another application of these strategies may be found in Robert Spence and Mark Apperley, "Database Navigation: An Office Environment for the Professional", *Behavior and Information Technology*, 1982, pp. 43–54, in particular at pp. 48–52, wherein there is disclosed a 2D display, called the Bifocal Display. The Bifocal Display contains a detailed view of information positioned in a horizontal strip combined with two distorted views, where items on either side of the detailed view are distorted horizontally into narrow vertical strips. The combined views make the entire data structure visible to the system user. The Bifocal Display technique makes use of the visual display of graphical representations of data items to facilitate the identification and location of information of interest and permits that information to be pulled into a central "close-up" region for more detailed examination. Spence and Apperley disclose that, by this action, the whole strip of data representing the information structure is moved across the display area, preserving the spatial relationships between individual items while retaining the overall view of the entire information structure. The display permits a zoom action to be carried out within the central region in order to increase the level of detail about a data item provided there. Spence and Apperley further disclose that attributes suitable for encoding the data items in the information structure in the outer regions of the Bifocal Display include color, shape, size, tags, pulsed illumination, and position, and they suggest that the use of alphanumerics be restricted to possibly only a single character per item. Spence and Apperley also discuss the application of the Bifocal Display presentation technique to a personal diary, or calendar, information structure, where a 2D arrangement of diary pages allows for the horizontal scrolling of weeks and the vertical scrolling of days into and out of the central region from the outer regions. In the central region the diary is considered to be a 2D arrangement of "pages", each representing one week, which can be scrolled through the central viewport both vertically (by days) and horizontally (by weeks) such that at a given time any seven contiguous days can be seen in detail.

Baker et al. in U.S. Pat. No. 5,226,118 discloses a data analysis computer system capable of storing measurement data from plural measured processes and definitions for many data analysis charts. There is further disclosed a data display gallery feature which divides the computer system's display into a two dimensional array of cells, called a graphical spreadsheet or gallery, having cell definitions assigned to at least a subset of the cells. Each cell definition consists of either a set of measurement data which can be displayed as a unit, or a mathematical combination of a plurality of specified sets of measurement data. Typically each displayed cell contains a data map depicting a set of data in accordance with a corresponding cell definition. Each cell in the gallery is a graphic image representing an independent data analysis unit, and data points for each cell are selected by the user from a currently displayed control or trend chart, allowing visual comparison of plural data maps. Since each cell is independent from other displayed cells, the user of the system may assign each cell a different type of display or data analysis function using data mapping and data analysis menus. If the number of cells in the gallery exceeds the number that can be viewed at any one time, the vertical and horizontal scroll bars on the edges of the gallery display can be used to scroll the display so as to bring any particular cell into view. Thus, the graphical spreadsheet disclosed by Baker may not display all of the available data in one display area or workspace, and is not a spreadsheet, or table of data showing interrelated information by rows and columns in the more commonly understood sense.

Researchers concerned with the optimal construction and presentation of graphs, charts, maps and the like provide another source of related work for the study of effective information presentation. For example, Jacques Bertin, in a comprehensive book about the study of graphics as a sign system entitled *Semiology of Graphics* (1983 English translation from the French 1973 second edition), discusses, in Part II of the book, theories for constructing a class of graphs called diagrams, which include "image" and table, or "matrix", files, using graphic information processing techniques so as to effectively display large amounts of related data in a single graphic. The image and matrix files, for example, represent quantities by variation in an amount of black ink.

These examples of information presentation techniques do not address, either individually or in combination, the particular problems associated with processor-controlled systems designed for effectively presenting information suited for display in a two-dimensional (2D) table or spreadsheet image structure where the positional relationship of data arranged by rows and columns conveys information about the data, and where the presentation of all of the detail contained in the sets of related information arranged in a row or column is necessary for a system user to accurately access the data in the underlying data structure via interaction with the image. The "fisheye" techniques as applied to a rectangular image such as a calendar do not adequately address the general problem of the presentation of the data in the non-focus areas. The 3D Perspective Wall requires specialized processing hardware, and may be unsuited for the display of interrelated table data, where 3D distortion of cell region sizes may detract from information understanding. The graphical spreadsheet disclosed in Baker et al. is not actually suited for the type of interrelated data organization typically intended for display in table form, since each cell is independent from the others. The graphical mapping techniques disclosed in Bertin do not address the issues of simultaneously presenting both the global and local context of the interrelated information presented in a table image. Many of these information presentation examples do not provide mechanisms for shifting between the global and focus modes, and for efficiently navigating through, a table image to rapidly locate data of interest. Moreover, none of these examples of information presentation techniques address the problem of effectively displaying table images that are too large to fit in the display area while simultaneously providing a system user with efficient access to data in individual cells.

SUMMARY OF THE INVENTION

The method and system of the present invention address the above-described deficiencies of existing examples of information presentation techniques specifically for the domain of information structured in an n-dimensional (nD) data array that is suitable for display in a table or spreadsheet image structure where the positional relationship of data arranged by rows and columns conveys information about the data, and where the presentation of all of the detail contained in the sets of related information arranged in a row or column is necessary for a system user to accurately access the data in the underlying information data structure via interaction with the image. The method and system address the problem of providing a general presentation method for the data in non-focal regions by making use of a novel graphical mapping technique for presenting a table image representing an information data structure utilizing graphic images in the data cells in place of and as representative of respectively paired non-graphical data in the information data structure. This graphical mapping technique provides a powerful mechanism for visually inspecting patterns and trends in the underlying data.

In addition, a well-designed user interface provides a system user with facilities such as row or column sorting, row or column reordering, and row or column addition by defining a new row or column from existing row or columns in order to rearrange the graphical images to reveal additional patterns and trends in the underlying information data.

Moreover, the graphical mapping technique of the method and system of the present invention is particularly effective for displaying table images that are otherwise too large to fit in the display area. The method and system of the present invention make use of a novel graphical mapping technique for presenting a table image representing an entire information data structure utilizing graphic images of the non-graphical data in cells that are not of interest to the user while simultaneously providing a system user with efficient access to data in individual cells of interest.

Several advantages are immediately apparent from the method and system of the present invention. The present invention requires very little specialized skill by the system user beyond the skills already acquired in using an application program that presents and allows manipulation of table images. Moreover, the technique takes advantage of human cognition and perception capabilities by providing character data in a graphical form to permit inspection of the data for patterns and trends in a global context. In addition, the table image presentation technique of the present invention provides improved spatially and temporally efficient access to the data in the information data structure by maintaining a user-controlled focus plus global context view of the information. The technique can be easily integrated into conventional spreadsheet and other table-oriented application programs.

Therefore, in accordance with the present invention, there is provided a method of operating a system. The system includes an input signal source, such as a user input device, for producing signals indicating image display requests, output circuitry connected to a display having a display area for presenting images, a memory for storing data including instruction data indicating instructions a processor executes, and a processor connected for receiving the signals from the input signal source, for providing images to the output circuitry, and for accessing the data stored in the memory. The method includes operating the processor to receive request signal data from the input signal source indicating a display request to present an image, referred to as a table image, in the display area. The table image includes a plurality of column identifier regions, a plurality of row identifier regions, and a plurality of cell regions. The plurality of cell regions is determined by the number of source data items included in an n-dimensional (nD) data array stored in the memory, where n is at least two, since each source data item is paired with a respective cell region in the table image. Data along each dimension of the nD data array indicates a set of related source data items indicating related information, and each source data item has a source data value indicating non-graphical information. Each source data item also indicates a cell presentation type data item indicating a cell presentation type of a graphical display object to be presented in the respectively paired cell of the table image. Next, the processor responds to the request signal data indicating the display request by determining cell region width and height dimensions for each one of the plurality of cell regions to be displayed in the table image in the display area such that the table image presented in the display area includes all of the required cell regions. Then, the processor produces image definition data defining the table image including the plurality of column identifier regions, the plurality of row identifier regions, and the plurality of cell regions each having the respective cell region width and height dimensions. Then, for each respective cell region included in the table image, the processor accesses a respective source data item in the nD data array and obtains the source data value of the respective source data item and the cell presentation type of the cell presentation type data item indicated by the respective source data item, and produces image definition data defining a graphical display object having size dimensions suitable for presentation in the respective cell region of the table image. The graphical display object includes a first display feature determined by the cell presentation type indicated by the respective source data item, and a second display feature determined by the source data value of the respective source data item. The processor then provides the image definition data defining the table image and each graphical display object representing the respective source data item to the output circuitry connected to the display so that the display presents the table image in the display area and presents each graphical display object in the respective one of the plurality of cell regions of the table image. Thus, for the plurality of source data item included in the nD data array, the graphical display objects presented in the respective cell regions represent both the cell presentation type and the source data value of the non-graphical information indicated by each respective source data item, and provide a graphical view of all of the data in the nD data array in the display area.

In accordance with the present invention, there is also provided a system including input circuitry connected to a user input device for receiving signals indicating image display requests from a system user, output circuitry connected to a display having a display area for presenting images, a memory for storing data including instruction data indicating instructions a processor executes, and a processor connected for receiving the signals from the input signal source, for providing images to the output circuitry, and for accessing the data stored in the memory. The data stored in memory also includes an n-dimensional (nD) data array where data along each dimension indicates a set of related source data items indicating related non-graphical information. The processor of the system, in executing the instructions, receives request signal data from the input circuitry indicating an image display request from the system user to present a table image in the display area including a plurality of column identifier regions, a plurality of row identifier regions, and a plurality of cell regions each of which shows a respectively paired one of the plurality of source data items in the nD data array. The processor further, in executing the instructions, responds to the image display request by determining cell region width and height dimensions for each one of the plurality of cell regions to be displayed in the table image in the display area such that the table image presented in the display area includes all of the cell regions, and by producing image definition data defining the table image including the plurality of column identifier regions, the plurality of row identifier regions, and the plurality of cell regions each having the respective cell region width and height dimensions. For each respective cell region included in the table image, the system's processor then accesses a respectively paired source data item in the nD data array to obtain the source data value of the respectively paired source data item and a cell presentation type of a cell presentation type data item indicated by the respectively paired source data item, and produces image definition data defining a graphical display object having size dimensions suitable for presentation in the respective cell region of the table image. The graphical display object includes a first display feature determined by the cell presentation type indicated by the respective source data item, and a second display feature determined by the source data value of the respective source data item. The system's processor then further provides the image definition data defining the table image and each graphical display object representing the respective source data item to the output circuitry connected to the display so that the display presents the table image in the display area and presents each graphical display object in the respective one of the plurality of cell regions of the table image.

The present invention also provides an improvement to a processor-based system including a memory having instructions stored therein indicating instructions for a spreadsheet application program the processor executes, and including a display device having a display area for presenting an image of a spreadsheet having a plurality of cells arranged in a plurality of rows and columns, each of the cells including an image of character (non-graphical) information representing a respectively paired one of a plurality of data items stored in a data array in the memory of the system, each data item indicating character (non-graphical) information. In the improvement to the system the processor, in executing the instructions, replaces each character information image included in one of the respective cells with a graphical display object image including first and second display features representing respectively a cell presentation type and a data value of the respectively paired data item stored in the memory of the system.

In accordance with another aspect of the improvement of the present invention, when the image of the spreadsheet produced using the plurality of data items stored in the memory of the system cannot be completely displayed in the display area using the images of character information representing respectively paired ones of the plurality of data items, the processor further determines a new cell size for each of the plurality of cells displayed in the image of the spreadsheet using the size of the display area and a number of cells of a complete spreadsheet image. The processor then produces the graphical display object image including the first and second display features for each respective cell according to the new cell size for the respective cell, and displays the complete spreadsheet image in the display area using the new cell size and including the graphical display object image in each cell.

The novel features that are considered characteristic of the present invention are particularly and specifically set forth in the appended claims. The invention itself, however, both as to its organization and method of operation, together with its advantages, will best be understood from the following description of the illustrated embodiment when read in connection with the accompanying drawings. In the Figures, the same numbers have been used to denote the same component parts or acts.

BRIEF DESCRIPTION OF THE DRAWINGS

FIG. 17 illustrates a dialogue box for changing cell presentation type parameters, as provided by the user interface of the illustrated embodiment of the method of the present invention;

Figure 1:
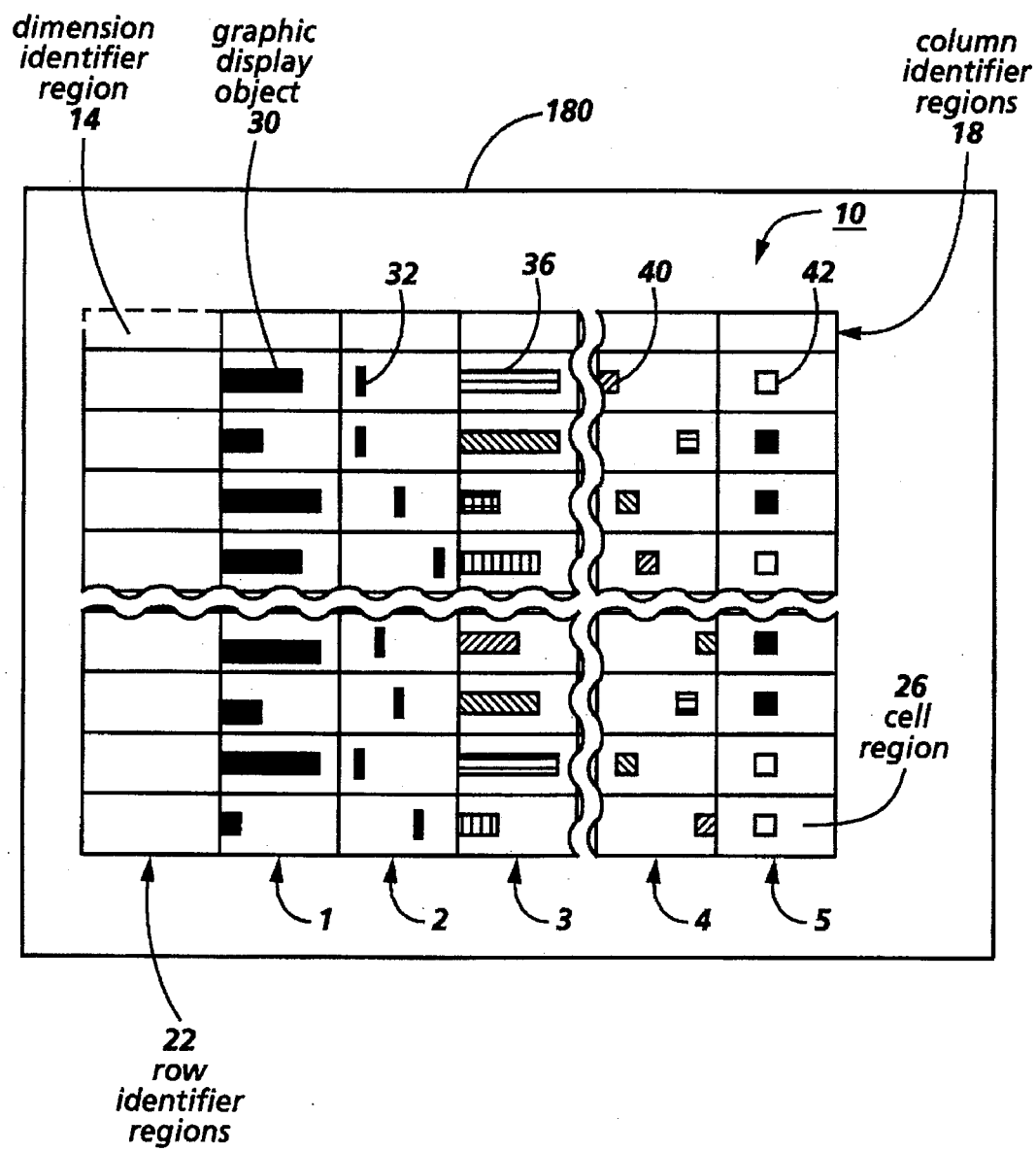
FIG. 1 illustrates an exemplary table image 10 produced by the method of the present invention showing a graphical display object in each of the cell regions.

While the present invention will be hereinafter described in connection with an illustrated embodiment, it will be understood that it is not intended to limit the invention to that embodiment. On the contrary, it is intended to cover all alternatives, modifications and equivalents as may be included within the scope of the invention as defined by the appended claims.

DETAILED DESCRIPTION OF AN ILLUSTRATED EMBODIMENT

Table 1: Detailed Description Table of Contents

A. Definitions
B. Description of the Method of the Present Invention.
  1. Producing a table image including graphical display objects representing information in an nD data array..
    a. The components of the table image.
    b. The underlying information data structure.
    c. The operation of the method for producing the table image.
  2. Defining and displaying focus plus context cell regions according to the method of the present invention.
    a. The layout of table image 80 in FIG. 7.
    b. A degree of interest (DOI) function determines the cell region sizes in table image 80.
    c. The operation of the method for producing focal regions in the table image.
    d. The operation of the method for combining focal regions with graphical data representations in the table image.
  3. Application of the method of the present invention to large data structures that produce large multiple-image table images.
  4. The user interface.
C. The system environment, system and software product of the present invention.
  1. The system environment.
  2. The system and software product.
D. Additional Considerations
  1. Application in a 3D environment A. Definitions The present invention relates to method steps for operating a system including a processor, and to processing electrical or other physical signals to produce other desired physical signals. The detailed descriptions which follow are presented largely in terms of display images and symbolic representations of operations of data within the memory of the system. These descriptions and representations, which are algorithmic in nature, are the techniques used by those skilled in the data processing arts to most effectively convey the substance of their work to others skilled in the art. An algorithm is here, and generally, conceived to be a self consistent sequence of acts leading to a desired result. These acts are those requiring physical manipulations of physical quantities such as electrical or magnetic signals that are capable of being stored, transferred, combined, compared, and otherwise manipulated. It proves convenient at times, principally for reasons of common usage, to refer to these signals by a variety of terms, including bits, values, elements, pixels, symbols, characters, terms, numbers, items, or the like. However, all of these terms and the additional terms defined below are convenient labels applied to appropriate physical quantities.

Further, the manipulations performed are often referred to in terms, such as adding, comparing, or determining, which are commonly associated with mental operations performed by a human user. The capability of a human user is neither necessary nor desirable in the operations described herein which form part of the present invention. In some aspects of the present invention, however, the system operations are performed in response to operation request signals produced by a human user. In addition, the algorithmic descriptions presented herein of the acts of the present invention for operating a system are not inherently related to any particular processor, machine, or other apparatus. Useful machines for performing the operations of the present invention include general purpose digital computers or other similar devices configured as described below and in the claims.

The present invention also relates to a system for performing these operations. This system may be specially constructed for the required purposes or it may comprise a general purpose computer selectively activated or reconfigured by a computer program stored in the computer. In particular, various general purpose machines may be used with programs in accordance with the teachings herein, or it may prove more convenient to construct more specialized apparatus to perform the required acts of the method. The required structure for a variety of these machines will appear from the description given below.

Preliminary to describing the embodiment of the claimed invention illustrated in the accompanying drawings, the terms defined below have the meanings indicated throughout this specification and in the claims.

The term "data" refers herein to physical signals that indicate or include information. The term "data" includes data existing in any physical form, and includes data that are transitory or are being stored or transmitted. For example, data could exist as electromagnetic or other transmitted signals or as signals stored in electronic, magnetic, or other form.

An "item of data" or a "data item" is a quantity of data that a processor can access or otherwise operate on as a unit. For example, an eight-bit byte is a data item in many data processing systems. Data can be combined into a "data structure". A "data structure" is any combination of interrelated data. A data structure may also include other data structures. An "array of data" or "data array" or "array" is a combination of data items that can be mapped into an array.

A "processor-controlled machine", "processor-controlled system" or "processor" is any machine, component or system that can process data, and may include one or more central processing units or other processing components. Any two components of a machine or system are "connected" when there is a combination of circuitry that can transfer data from one of the components to the other. The component from which the data is transferred "provides" the data, and the other component "receives" the data. For example, two processing units are "connected" by any combination of connections between them that permits transfer of data from one of the processing units to the other. A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor "uses" data in performing an operation when the result of the operation depends on the value of the data. An "instruction" is an item of data that a processor can use to determine its own operation. A processor "executes" a set of instructions when it uses the instructions to determine its operations.

"Memory" is any component, combination of components, circuitry, or system that can store data, and may include local and remote memory and input/output devices. An example of memory is a storage medium access device with a data storage medium that it can access.

A "data storage medium" or "storage medium" is a physical medium that can store data. Examples of data storage media include magnetic media such as floppy disks and PCMCIA memory cards, optical media such as CD-ROMs, and semiconductor media such as semiconductor ROMs and RAMs. As used herein, "storage medium" covers one or more distinct units of a medium that together store a body of data. For example, a set of floppy disks storing a single body of data would be a storage medium. A "storage medium access device" is a device with circuitry that can access data on a data storage medium. Examples include floppy disk drives and CD-ROM readers.

An item of data "indicates" a thing, an event, or a characteristic when the item has a value that depends on the existence or occurrence of the thing, event, or characteristic or on a measure of the thing, event, or characteristic. When an item of data can indicate one of a number of possible alternatives, the item of data has one of a number of "values". In addition, a first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. For example, when the data type value of a data type data item can be obtained from a source data item, such as when the source data item has a pointer to the data type data item or otherwise has information related to the location of a second item of data in the memory, then the source data item indicates the data type data item. In the figures herein, such a relationships between the data in memory is illustrated by an arrow from the first item of data to the second item of data, as shown, for example by arrow 818 in FIG. 2.

An "image" is a pattern of light. An image may include characters, words, and text as well as other features such as graphics. An "image output device" is a device that can provide output defining an image. A "display" or "display device" is an image output device that provides information in a visible, human viewable form. A display may, for example, include a cathode ray tube; an array of light emitting, reflecting, or absorbing elements; a device or structure that presents marks on paper or another medium; or any other device or structure capable of defining an image in a visible form. To "present an image" on a display is to operate the display so that a viewer can perceive the image. A "display area" is the portion of the display in which an image is presented or the medium which receives an image. The display area may include one or more "workspaces" wherein display features appear to have respective relative positions, and "presenting" a workspace in the display area that includes plural display features produces the human perceptions of the display features in respective positions relative to each other. A window is an example of a workspace.

Data "defines" an image when the data includes sufficient information to directly produce the image, such as by presenting the image on a display. Data defining an image will also be referred to herein as an "image definition" or "image definition data". For example, a two-dimensional array is an image definition that can define all or any part of an image, with each item of data in the array providing a value indicating the color of a respective location of the image. Each such image location is typically called a "pixel", and the two-dimensional array of data is typically called "image pixel data" or an "image pixel data structure". While image pixel data is the most common type of image definition data, other image definitions, such as vector list data, are intended to be included within the meaning of data defining an image.

The term "display feature" refers to any human perception produced by a display in a processor-controlled machine or system. A "display object" or "object" is a display feature that is perceptible as a coherent unity. A "shape" is a display object that has a distinguishable and perceptible outline; for example, a circular display object is a shape. A shape having a bounded area may be called a "region". An image "includes" a display feature or object if presentation of the image can produce perception of the feature or object. Similarly, a display object "includes" a display feature if presentation of the display object can produce perception of the display feature. For example, display object 30 in FIG. 1 is a rectangular display object having a black-filled interior of a certain height and width (or length) relative to the cell region 26 in which it is included. The rectangularity, the color of the interior space, the width, and the height of display object 30 are all perceptible display features included in the display object.

A display feature or display object is not limited to a strictly pictorial representation. An image may include "character display features". When presented in image form in the display area of a display device, "characters" may be referred to as "character display features". "Character" as used herein means a discrete element that appears in a written or printed form of a particular language, and is a symbolic representation of information directly perceivable by a human who understands the particular language. Characters in the English language, for example, include alphabetic and numerical elements, punctuation marks, diacritical marks, mathematical and logical symbols, and other elements used in written or printed English. Character information is also often referred to generally as "text".

The "table image" produced by the method of the present invention includes a plurality of row identifier regions, a plurality of column identifier regions, and a plurality of cell regions. The cell regions are arranged in the table image in row and column order such that the width of the cell region in any one column is the same as the width of the column's respective column identifier region; the height of the cell region in any one row is the same as the height of the row's respective row identifier region; the range of x locations of a cell region in the display area is the same as the range of x locations of the cell region's respective column identifier region; and the range of y locations of a cell region in the display area is the same as the range of y locations of the cell region's respective row identifier region in the display area.

Figure 14:
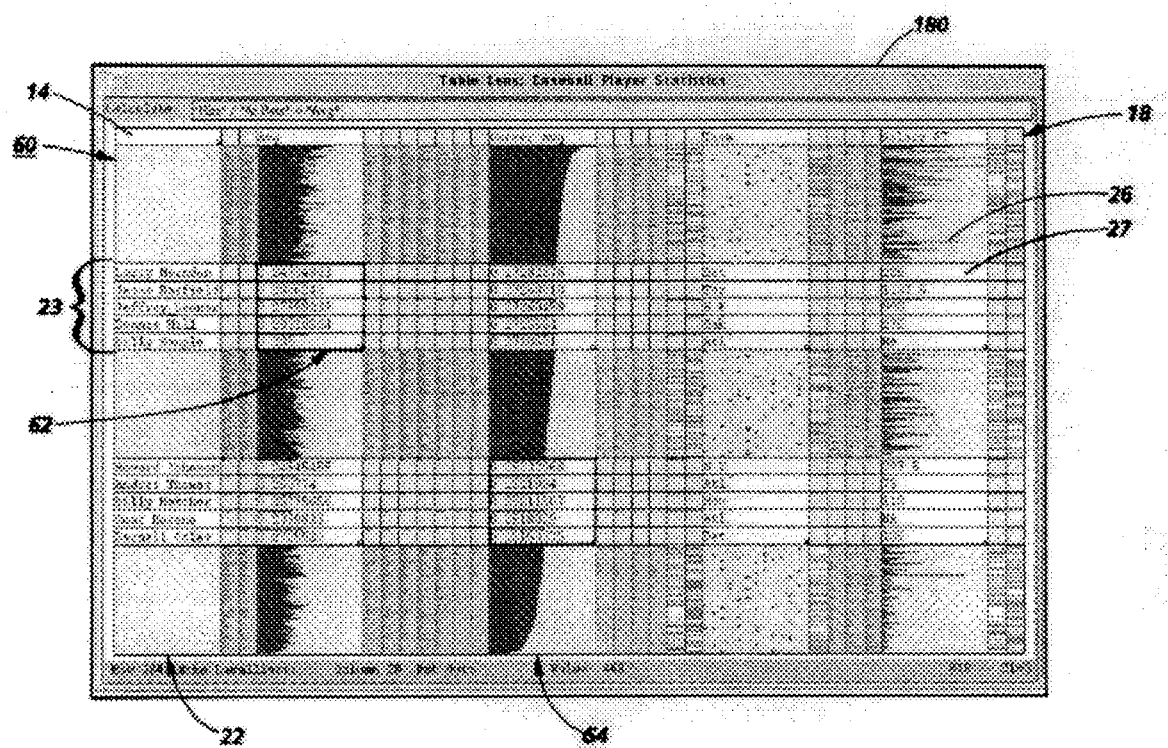
FIG. 14 is display screen showing a table image produced by the illustrated embodiment of the method of the present invention, according to the method illustrated in FIG. 12.

A common characteristic of processor-controlled systems operated by the method of the present invention is a mapping between items of data within the system and display features included in images presented by the system. A display feature "represents" a body of data when the display feature can be mapped to one or more items of data in the body of data, or, stated in another way, a display feature "represents" the item or items of data to which it can be mapped. For example, in a table image, the character display features that are presented in the image as an entry in a cell region typically "directly represent", and can be mapped to, an item of data in a data structure such as a data array. The character display features in an image "directly represent" an item of data when each character display feature is a one-to-one mapping of an item of data, or a portion of an item of data, having a character data value to which it can be mapped; the character display features are a direct representation of the character data values. Thus, for example, a conventional application program typically produces a table image including character display features in the cell regions that directly represent the alphanumeric information included in the underlying data structure, as shown in FIG. 14. Cell regions 23 shows character display features which are direct mappings from data items in the data array.

Figure 3:
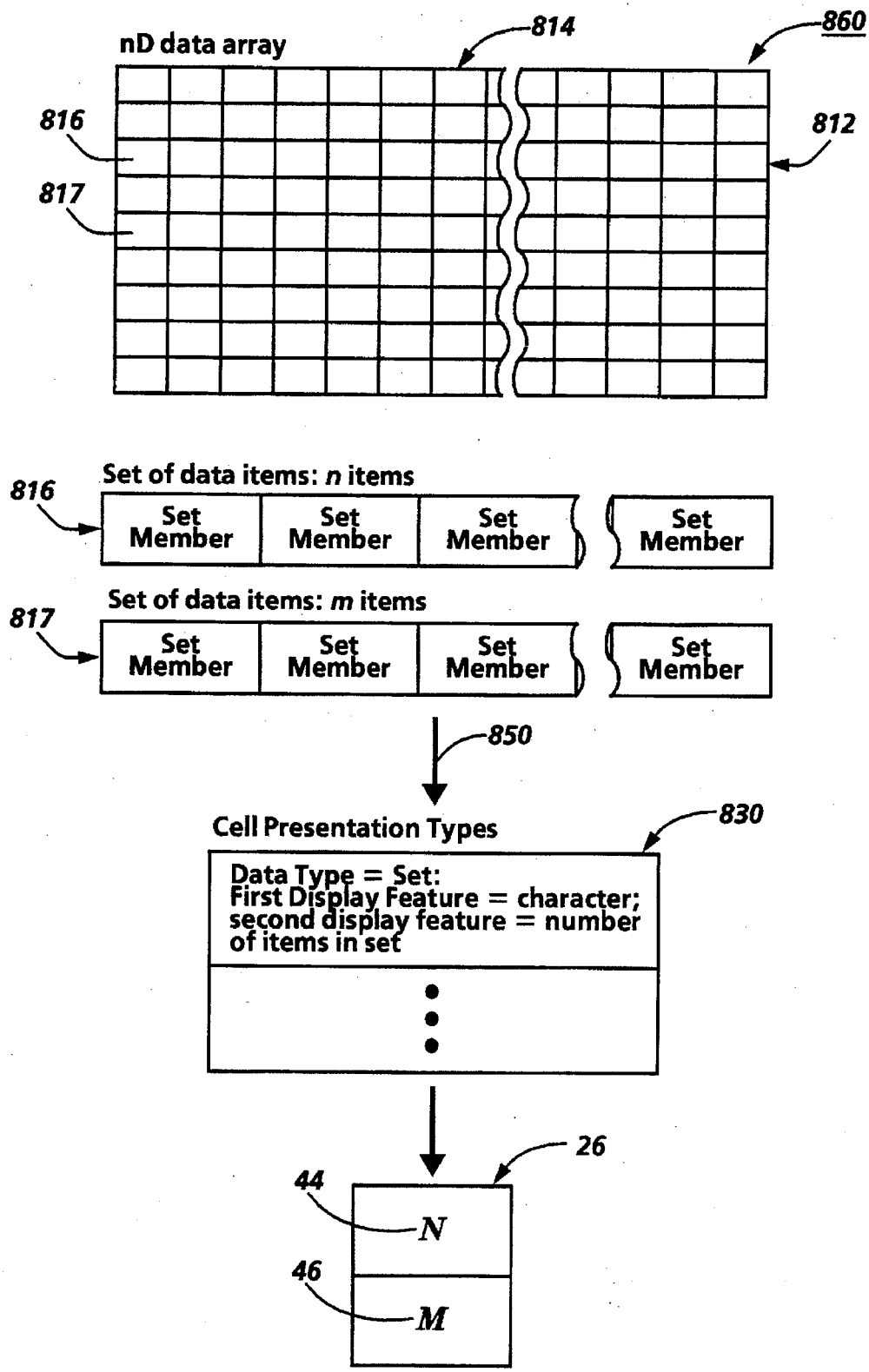
FIG. 3 schematically illustrates a variation of the nD data array shown in FIG. 2 for a more complex data organization.

The method of the present invention produces a "graphical" display object for display in the table image. As used herein, a graphical display object is an "indirect" representation of the information included in the underlying data structure. Generally, but not necessarily, a graphical display object will include display features other than character display features when the underlying data from which the graphical display object is mapped is character information. Examples of graphical display objects include, but are not limited to, circular, rectangular, and triangular shapes with or without interior fill color, lines of various thicknesses, combinations of shapes and lines, features perceivable as images of physical objects, and the like. Thus, a graphical display object is more of a pictorial representation of information than the directly symbolic representation of information that is conveyed by characters. However, as discussed in more detail below, there are instances when the underlying data is effectively indirectly represented by a graphical display object that includes character display features. For example, when a data item is a composite object or a bit map or other complex data structure, a single character display feature may indirectly represent the complex data structure in the cell region of the table image. When used in this sense, character display features are used as graphical elements in an essentially graphical image. Table 3 below and FIG. 3 provide examples of the use of character display features as indirect graphical representations of data items.

The mapping of one or more items of data to a display feature or object is performed by an "operation" which is used herein to mean a set of instructions (instruction data items) accessible and executable by the processor in a system, defining the mapping relationship or function between one or more items of data (an input of the operation) and a display feature or object in an image (an output of the operation). An operation "produces" a display feature or object in an image when the operation begins without the data defining the display feature or object in the image and performing the operation results in the data defining the display feature or object in the image. When the operation uses items of data as input to produce data defining a display feature or object in an image, the display feature or object is "produced from" those input data items.

One way of categorizing an operation is to distinguish it by the type of data the operation uses as input. The method of the present invention is a "model-based operation". A model-based operation uses "model data" as input and may produce image definition data defining an image as output. A data item other than image definition data, for example, a data item other than an image pixel data item, is an "information model data item" or "information data". A combination of interrelated information data items is referred to herein as an "information model data structure", or a "information data structure". A model-based operation maps one or more information data items in an information data structure to a display feature included in the image produced by the operation. An information data structure is not limited to a combination of data items physically located in a substantially contiguous part of a system's memory, but may include individual model data items diversely located in memory and accessible by the processor when it performs the operation. A model-based operation is distinguishable from an image-based operation that maps one or more image definition data items, such as pixels, to a display feature included in the image produced by the operation.

B. Description of the method of the present invention.

1. Producing a table image including graphical display objects representing information in an nD data array.

a. The components of the table image.

FIG. 1 illustrates an example of a table image 10 produced by the method of the present invention. Table image 10 is displayed in display area 180 of display device 170 (FIG. 20), and includes a number of column identifier regions 18, row identifier regions 22, an optional dimension identifier region 14, shown in dotted lines, and a number of cell regions 26. The wavy lines and breaks in the table indicate that the size of table image 10 is not a fixed size, but is determined by several factors discussed in more detail below. Each of the row and column identifier regions 18 and 22 may contain character label information respectively identifying the contents of the information in the row and columns. Dimension identifier region 14 may contain character label information identifying a common characteristic or property about the information contained in the rows or in the columns, or the table generally.

Each cell in the table image is paired with a respective source data item stored in the memory of the system, and, in a conventional table image, the information in a respectively paired data item is presented in the respectively paired cell. Such information typically includes numeric data such as quantities and dates, text data, and various types of alphanumeric encoded data which, when decoded, indicates one of two or more categories of information. Typically, the data appearing in the group of cells in a single row represents related elements of information governed by some relation or concerning a common subject (sometimes called the "invariant" or the "case") identified in the row identifier region, and the data appearing in the group of cells in a single column are instances of the same type of information common to all subjects (sometimes called the "component" or the "variable") and identified in the column identifier region. The use of rows and columns in this manner may of course be reversed depending on the organization of the underlying data.

Each of the cell regions in table image 10 produced by the method of the present invention contains, in place of the character information typically presented in a conventional table image, a graphical display object, illustrated examples of which include, but are not limited to, black-filled bar 30, small rectangular black-filled object 32, color-filled bar 36, color-filled square 40, and black- or white-filled square 42. At least one of the display features of each graphical display object appearing in a cell represents a "cell presentation type" that has been determined by a data type associated with, or indicated by, the character, or nongraphical, data of the respectively paired source data item. Generally, although not necessarily, all of the source data items in a single column have the same data type, and thus all of the graphical display objects in the column will be of the same presentation type. In addition, another display feature of each graphical display object appearing in a cell may graphically represent the source data value of the respectively paired source data item, so that a single graphical display object will represent both the data type and data value of the underlying respectively paired source data item.

With continued reference to FIG. 1, the presentation types shown by the graphical display object examples illustrated therein are summarized in Table 2 below:

TABLE 2

FIG. 1 Columns 1-5: Cell Presentation Types

| Col. | Data Type/Value | Presentation Type |
| --- | --- | --- |
| 1 | Quantity Data; numeric quantity value | black-filled bar; bar length in cell determined by quantity data value; |
| 2 | Category Data; alphanumeric category value | black-filled rectangular object; size of object determined by number of categories; cell position of object determined by category data value; |
| 3 | Quantity and Category Data | color-filled bar; bar length in cell determined by quantity data value; fill color determined by category value and number of categories; |
| 4 | Category Data | color-filled square object (color swatch); fill color and cell position determined by category data value; object size determined by number of categories; |
| 5 | Category Data (Boolean) | black- or white-filled square object; fill color determined by category data value |

The exemplary presentation types listed in Table 2 are not intended in any way to be limiting. Numerous variations of these presentation types and many other presentation types are possible. For example, the variable display features, or parameters, of a graphical display object produced from a cell presentation type include object length or width; object color variations, such as variations in hue, saturation, lightness or density; object position in the cell area; the area of the object; the slope of the object; and the angle of the object. In general, the design of a cell presentation type uses principles of graphic design to select the graphical features most suited for the particular data type and range of data values, and that take advantage of human cognitive skills for most effectively decoding graphical information. Table 3 below provides additional examples of cell presentation types for more complex data types and data values. Upon inspecting the examples in Table 3, it can be seen that many of the complex data structures contain combinations of quantity and category components.

TABLE 3

Other Cell Presentation Type Examples

| Data Type/Value | Cell Presentation Type Examples |
| --- | --- |
| Date data (e.g., in form of mm/yy) (Category data) | For practical year range (e.g., 10 year period), color-filled square object (color swatch); fill color determined by year (category) data value; cell position determined by month (category) data value; |
| A set of data items, or objects; contains individual set members each having a quantity value; number of items in set is numeric quantity that can be determined; | 1. character display feature (numeral) represents data type and number of items in set; cell position of character display feature determined by whether a certain set member exists in each set (Boolean category value); 2. black- or white-filled square object; fill color determined by whether a certain set member exists in each set (Boolean category value); |
| Composite Document data type; contains data about author, title, date of publication, document type (e.g., spreadsheet word processing illustrator etc.) full text; multi-media components, etc. | Any one or more components of the composite document information may be graphically represented. For example: 1. color-filled bar; bar length in cell determined by length of title (computed quantity data value); fill color determined by author (category value); 2. black-filled bar; bar length in cell determined by length of document (computed quantity data value); OR numeric character display features, where number is computed length of document; 3. black-filled bar; bar length in cell determined by number of occurences of a keyword in document; 4. color-filled square object (color swatch); fill color and cell position determined by document type (category data value); object size in cell determined by total number of categories; |

In the illustrated embodiment, each graphical display object that is produced from a mapped cell presentation type has at least two distinguishing display features: one display feature represents the data type of the source data item (discussed in more detail below), and another display feature represents the data value of the data item. In other implementations, each graphical display object produced from a selected presentation type has at least one distinguishing display feature representing the data type of the source data item.

b. The underlying information data structure.

Figure 2:
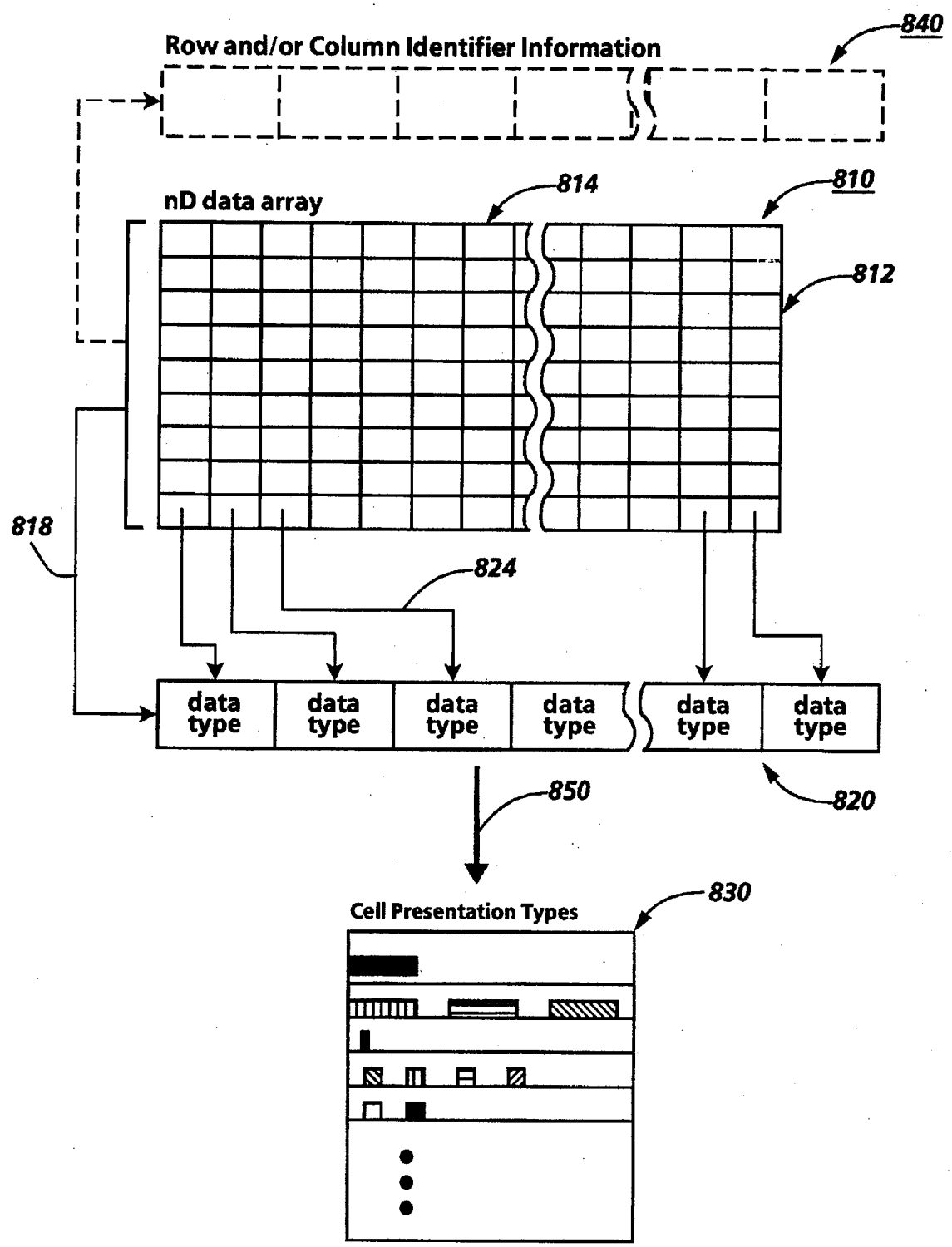
FIG. 2 schematically illustrates the components and general organizational structure in memory of the data used by the method of the present invention.

FIG. 2 schematically illustrates the data structures used to produce table image 10 of FIG. 1 in the illustrated embodiment. The model data is organized in an n-dimensional ("nD") data array of at least two dimensions, shown by way of example in FIG. 2 as 2D data array 810. As noted above with respect to the organization of cell regions 26 in table image 10, and as is conventionally understood with respect to data capable of being represented in tabular form, the data organized in individual instances of one dimension, such as in row 812, represents related information about an instance of the invariant. Data appearing in individual instances of a second dimension, such as in column 814, represents the same component type of information about each instance of invariant. Each individual data item in nD data array 810 will be referred to herein as a "source data item". In general, any model data having these characteristics and suitable for organizing in an n-dimensional (nD) data array may take advantage of the method of the present invention. In addition, any of a number of conventional array indexing programming techniques may be used by the system processor to access and obtain individual source data items in nD data array 810 for further processing, such as for display in a cell region 26 in table image 10. For purposes of display and presentation of the information in nD data array 810 in table image 10, each source data item is matched to a respective cell region 26 in table image 10 also using a conventional array indexing programming technique, and the source data item accessed and obtained via an indexing technique for a respective cell region 26 in table image 10 is referred to hereafter as a "respectively paired" source data item.

Data array 810 indicates, as shown via arrow 818, a data structure 820 of data type data items, each of which has a value that describes the data type of one or more source data items, such that each source data item indicates a respectively paired data type data item. The data type describes how to interpret the value of the data (called the "source data value") in the source data item. The source data values of the data in data array 810 will typically directly include character information or include one or more signals (e.g., bits) that are able to be decoded into character information. However, data array 810 may also include, as individual source data values, complex computer objects such as a simple or composite document object, a set, or a bit map. For example, data array 810 may define a collection of composite documents suitable for organizing in interrelated rows and columns, or a collection of bit maps representing pictures suitable for organizing in interrelated rows and columns.

Data type information will vary according to the particular data in nD data array 810, and examples of data types are included in Table 2 above (e.g., "quantity" and "category"). Category data is typically implemented as an encoding scheme where a character, numeric, or bit value in the source data item indicates one of several possible data values a data item may take on. For example, in a nD array of baseball statistics about baseball players, a source data item may contain a value indicating one of nine field positions the player currently plays. This source data item would therefore have a data type equal to "category", with the nine possible values following a decoding scheme whereby each value indicates a field position. Other data types may include descriptions, for example, of "text", "(calendar) date", and "composite object" source data items. Typically, since data organized in an instance of a second dimension of nD data array 810, for example, in one column, represents the same component type of information about each instance of an invariant, data type data structure 820 will contain one data type per data component, or column, as illustrated by arrow 824 and the similar unmarked arrows in FIG. 2. As will be seen from the discussion below in part B.3, table images produced from data in the nD data array organized so as to have one data type per column according to the method of the present invention produce very effective graphical overviews of the underlying data. However, the method of the present invention may also be useful for, and is therefore intended to encompass, the use of an input nD data array where each component (column) of data does not have a single data type and where each individual source data item indicates its own data type.

With continued reference to FIG. 2, cell presentation type data structure 830 contains presentation type information for each defined presentation type sufficient to produce a graphical display object for display in a cell region 26 including the first and second display features determined respectively by the data type and source data value for a respectively paired source data item. In FIG. 2, pictorial elements of various graphical display objects representing presentation types and organized in a linear one-dimensional array are merely symbolic of cell presentation type data structure 830. In the illustrated embodiment, cell presentation type data structure 830 is actually a set of software routines, or pointers to software routines, entry to which is controlled by a one-to-one mapping of a data type to a presentation type routine, illustrated by arrow 850 in FIG. 2. Those of skill in the programming arts will appreciate that a variety of other conventional programming techniques may be used to implement cell presentation type data structure 830.

Finally, data accessed by the system may also include row and column identifier data structure 840. This data structure contains the optional heading or label information that appears in row identifier regions 22 and column identifier regions 18 of table image 10. In many applications that display conventional table images, such as spreadsheet and relational data base applications, label information is routinely provided because of its critical nature in conveying valuable information about the invariant and component data in the table. As will be explained in more detail below, in the illustrated embodiment, the ability to control the display and suppression of visible label information, especially in the environment of large table images, is a feature of the method of the present invention that further enhances the effective communication of the information in table image 10.

Table 3 presents examples of cell presentation types for source data items having more complex data structures, such as sets and composite data objects. FIG. 3 schematically illustrates the mapping from data array 860 of source data items 816 and 817 which are sets of data items, and have a data type of "set". Set 816 has n members, while set 817 has m members. Cell presentation type data structure 830 contains the cell presentation type for a "set" data type. Cell regions 26 in table image 10 show graphical display objects 44 and 46 as being character display features representing the number of members in each set. Thus, the entire complex source data item 816 of a set of member data items is indirectly and graphically represented in a cell region 26 of table image 10 as graphical display object 44.

The data structures of the present invention as described above and schematically shown in FIG. 2 illustrate the minimum connections and correspondences required between the data items. Various commonly used data structures may be suited for this purpose. For example, a relational data base may supply the source data items from which table image 10 is constructed. Relational databases provide support for automatically maintaining multiple data relations and generating static snapshots of the data in table format. Typically, a relational data base has one or more base tables associated with it consisting of a row of column identifiers (headings or labels) together with rows of data values. Data type information is also generally available or may be easily derived. The method of the present invention provides a relational database application with tools for dynamically visualizing and manipulating the data presented.

Similarly, the data structure provided in a conventional spreadsheet program may supply the source data items from which table image 10 is constructed. Typically, a spreadsheet data structure includes row and column identifier information, data type information, and table image layout information as well as the source data values for the cell contents. Source data items in a typical spreadsheet may include equations, and a cell presentation type for such cells may either graphically represent the source data value computed from the equation, or the equation itself.

c. The operation of the method for producing the table image.

Figure 4:
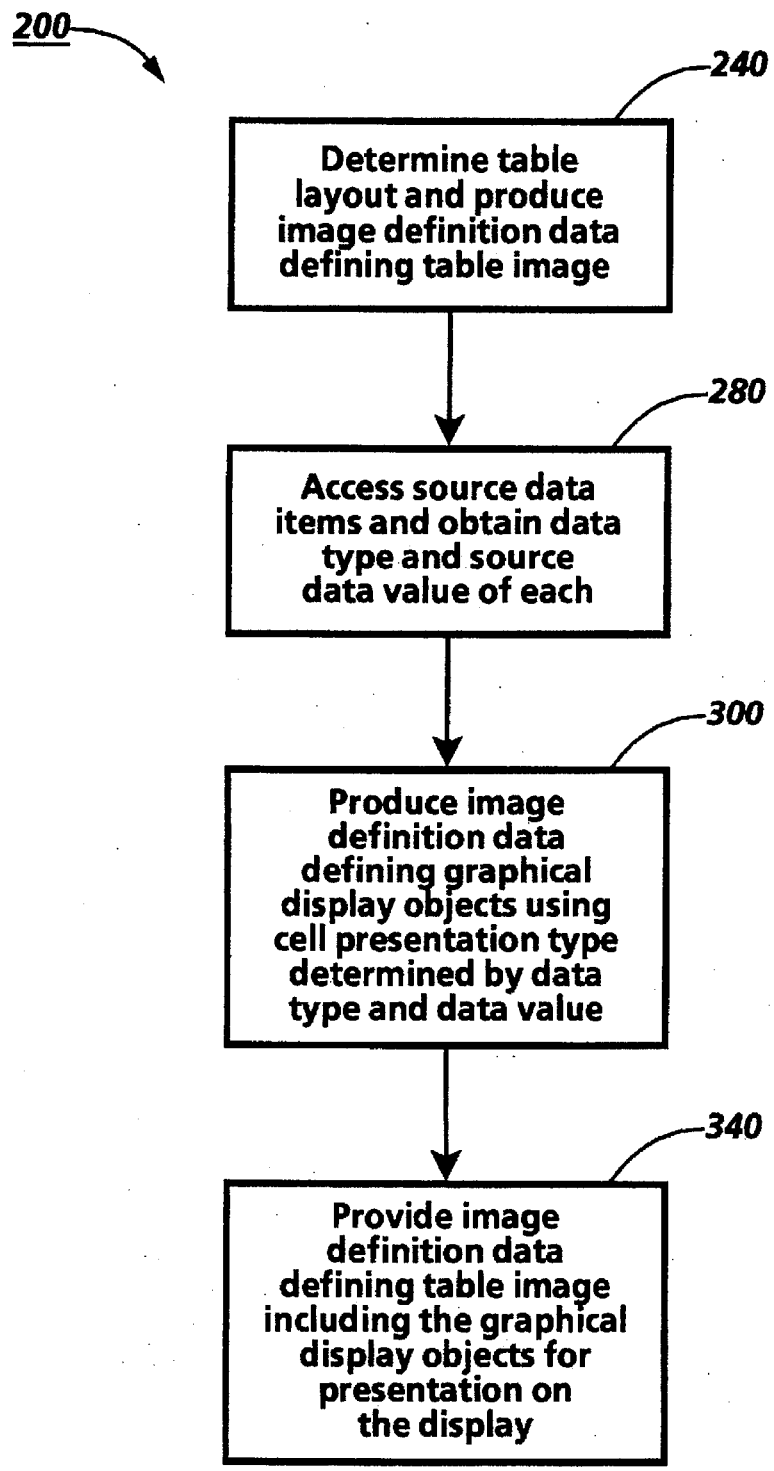
FIG. 4 is a flow chart illustrating the steps of producing a table image having a graphical representation of the underlying data in the cell regions according to the method of the present invention.

FIG. 4 illustrates the general steps of method 200 of the present invention for producing table image 10 of FIG. 1. In box 240, the overall table image layout is determined and image definition data defining the table border or outline, the grid lines for the row and column identifier regions and for the cell regions, and the contents (labels) of the row and column identifier regions is produced. For each cell region included in the table image, the source data items in nD data array 810 are accessed, in box 280, and the data type and source data value of each source data item is obtained. Then, in box 300, the image definition data defining the graphical display objects to be presented in the included cell regions are produced using the cell presentation type for the data type and data value of each respective source data item. The image definition data defining table image 10 and the graphical display objects is then provided to the output circuitry of the system, in box 340 for presentation in display area 180 of the system's display device.

Figure 5:
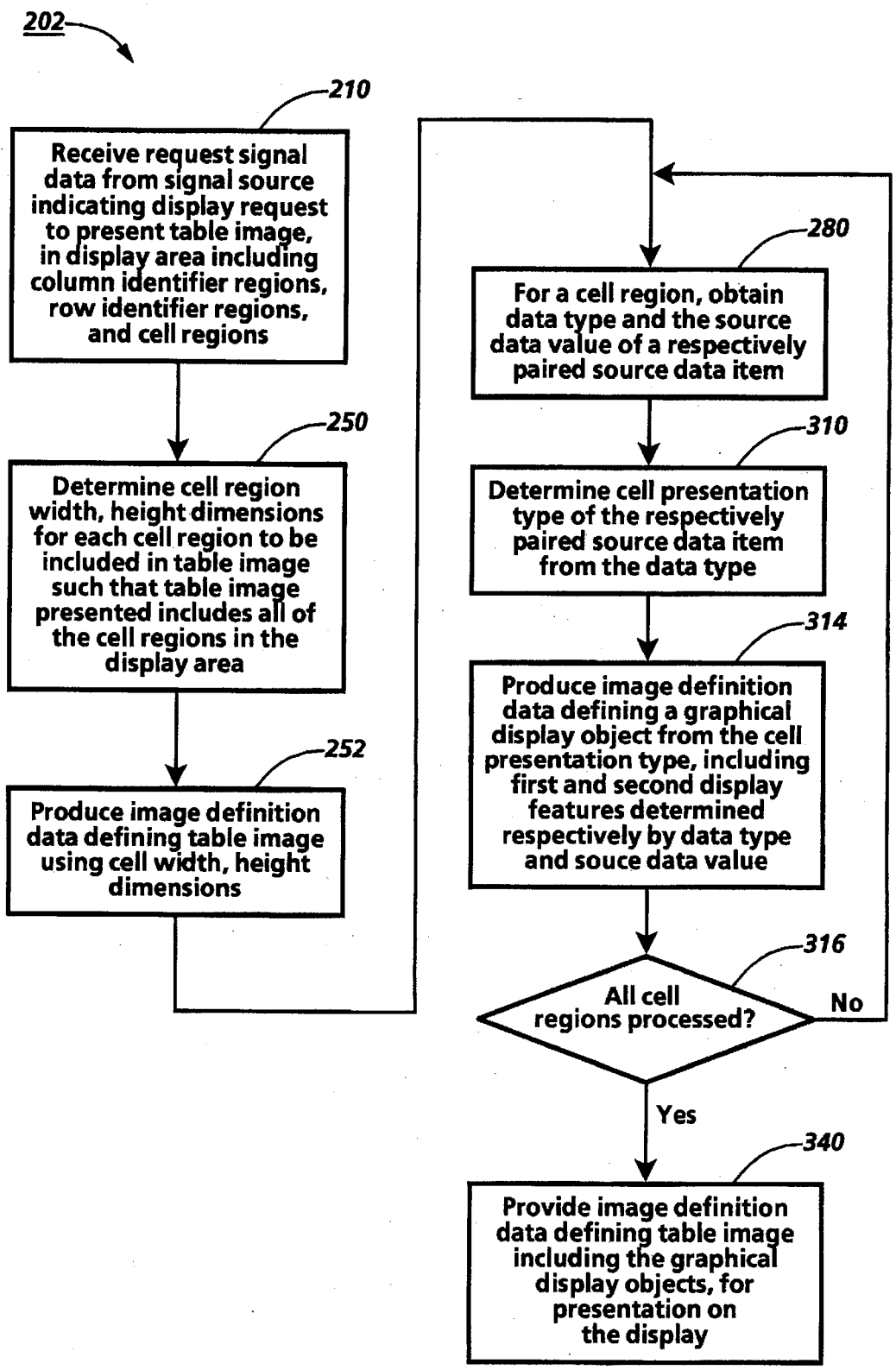
FIG. 5 is a flow chart illustrating the steps of producing table image 10 of FIG. 1 according to the method of the present invention.

FIG. 5 is a flowchart illustrating an expanded set of steps, in method 202, for presenting table image 10 in such a manner that it presents a cell region and graphical representation for every source data item in nD data array 810 in a single image, in response to an input signal indicating an image display request to display table image 10. Method 200 of FIG. 4 may be effectively used to display a portion of an entire table with indirect, graphical representations for the data in the included cell regions. However, an even more powerful use for the method of the present invention is to take advantage of the display space compression offered by an indirect graphical representation of the source data items in nD data array 810 by computing the table layout of table image 10 so as to accommodate all of the cell regions necessary to display the complete table, as shown in box 250. Boxes 280, 310, 314 and 316 then show the processing loop for accessing all source data items for every cell to be displayed and for producing the image definition data defining the graphical display object to be presented in the each cell region using the cell presentation type for the data type and data value of each respectively paired source data item. It will be clear to those of skill in the programming art that, when nD data array 810 is organized so that all of the source data items in each column 814 (FIG. 2) have the same data type, the efficiency and performance of the processing loop beginning with box 280 in FIG. 5 can be significantly improved by traversing nD data array 810 by row within column.

Figure 6:
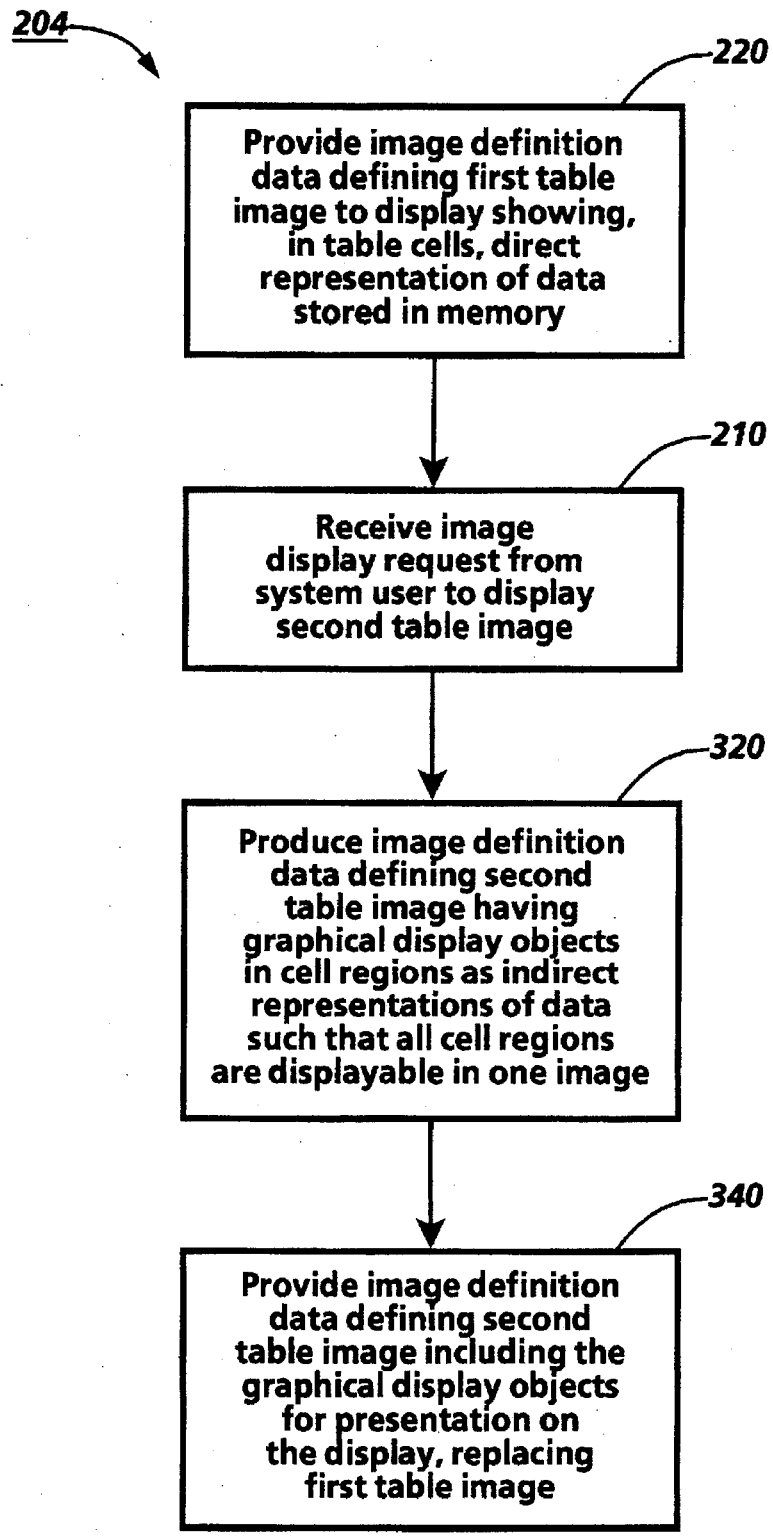
FIG. 6 is a flow chart illustrating a variation of the method shown in FIG. 5 as applied in the context of a conventional spreadsheet application.

FIG. 6 illustrates still another aspect of the method of the present invention that is useful when integrating the present method into an existing spreadsheet or relational data base application or the like where conventional table images, showing directly represented data, are displayed. In method 204, a conventional first table image is displayed in box 220. A system user uses an input device to produce signals indicating an image display request to display table image 10. In method 204, table image 10 includes cell regions for indirectly representing every source data item in the underlying nD data array 810 of the application. In response to the image display request by the system user, image definition data is produced, in box 320, defining a second table image having graphical display objects in the cell regions as indirect representations of the respectively paired source data items in the underlying data structure such that all cell regions are displayable in one image. Method 204 provides the system user of a conventional spreadsheet or relational data base program with the ability to compress an entire table that may require several table images to view by conventional scrolling or paging techniques into a single table image and to view the data in graphical form. The graphical view provides the ability to see patterns and trends in the data more easily and viewing the entire table in one image permits easier location of information of interest to the system user.

2. Defining and displaying focus plus context cell regions according to the method of the present invention.

Conventional table image processing applications, especially spreadsheet applications, typically provide roughly uniform amounts of display space for individual cells in the rows and columns. The amount of space for each cell is constrained by factors such as the space needed to adequately represent the data value of a respectively paired source data item and the total space available in the display area or workspace. The table layout, including the size of the cell regions, is often predefined and may not be easily varied by a system user. Roughly uniform cell regions provide few visual clues for quickly locating a particular cell region in the table image. In the case of a large table that occupies most of the display area, the area of each cell region may be necessarily computed to be small, and a system user may find the data representation in one or more cell regions of particular interest difficult to locate, access, read or understand.

Still another aspect of the present invention, then, provides for user control of the sizing of the cell regions of a table image to reflect the system user's level of interest in one or more cell regions. This aspect of the method of the present invention will be referred to herein as the "focus plus context" table image feature. Cell regions that the system user is currently using, by either reading or updating, become larger, and other cells, not currently being used and of current lesser interest, become smaller in response to a user signal invoking the focus plus context feature, without the overall size of the table image necessarily changing.

a. The layout of table image 80 in FIG. 7.

Figure 7:
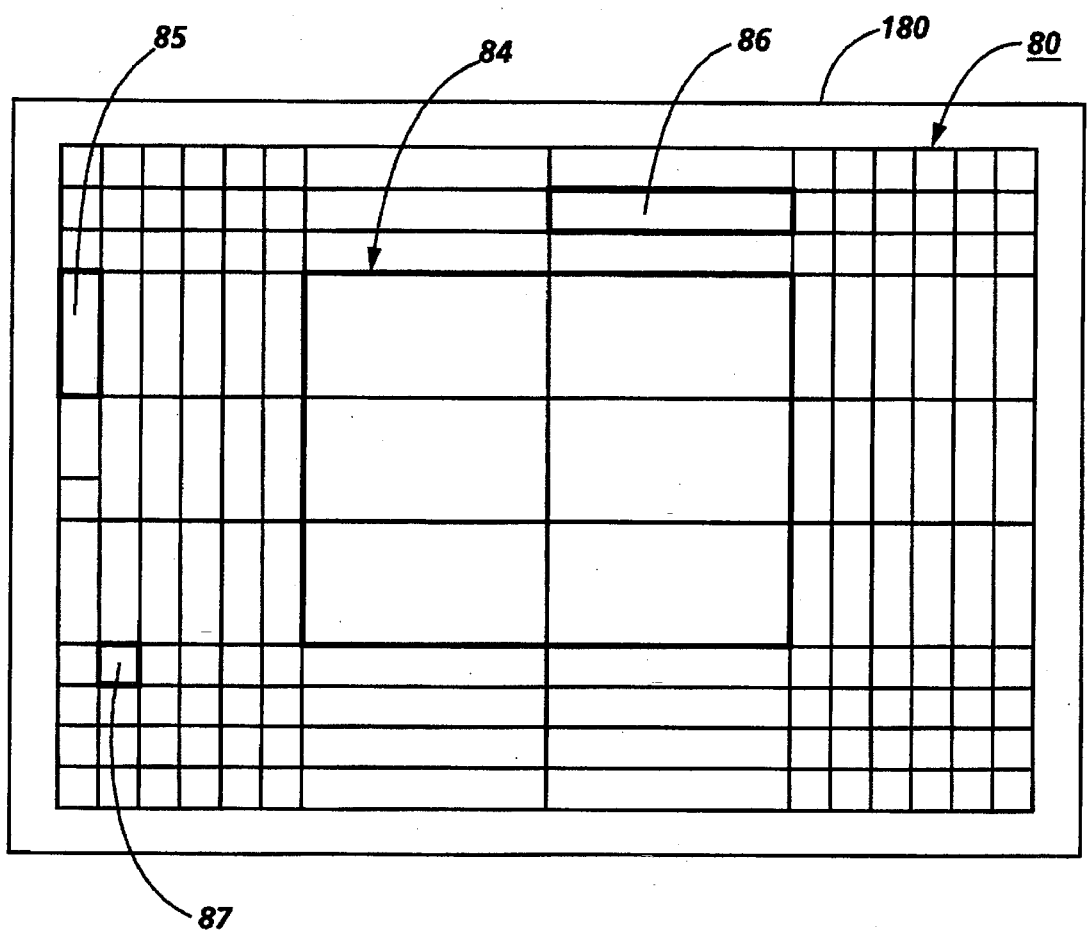
FIG. 7 schematically illustrates an exemplary table image 80 produced by the method of the present invention showing differently-sized cell regions for focal and for context regions of the table image, produced according to another aspect of the method of the present invention.

Table image 80 in FIG. 7 illustrates how the cell regions of a table image may be altered according to the focus plus context feature of the method of the present invention. As used herein, the size of table image 80 prior to the operation of the focus plus context feature of the method of the present invention on table image 80 will be referred to as its "natural" size, and is not necessarily shown in FIG. 7. The natural size of the table image may be predetermined by the application program or may be under the control of the system-user. The natural size of table image 80 is relevant to the operation of the focus plus context feature of the method only to the extent that it provides a natural size for each cell region in which the respectively paired data from the underlying data array may be directly represented in a meaningful form. In contrast to the natural size of table image 80, which is its input size to the method of the present invention, the "output" size of table image 80, shown in FIG. 7 is a predetermined size used by the processing steps of the method to compute the proper allocation among the different types of cell regions. The output size of table image 80 may be its natural size, the current window size, a system determined size, a user-determined size, or the size of the entire display area. In the illustrated embodiment, the output size of the table is governed by a current window size, shown as the size of display area 180.

Four types of cell regions are created, each of which has been marked by darker boundaries in FIG. 7 for ease of recognition only. Area 84 is the "focal region", having at least one cell region, called a "focal cell region" included therein; the size of each of the six focal cell regions in illustrated focal region 84 is computed using a number of factors, described in more detail below, including the natural size of each focal cell region and and the number of cell regions to be included in the focal region. Region 87 is called a "context cell region" or "context region"; a context region is a cell region that is in a row and column that is not the same row or column of a cell region in the focal region. A context cell region has the smallest cell size of the four types of cell regions created by the focus plus context method. Region 85 is a "row-focal region", having a cell width dimension along the x axis equal to the cell width of a context region located in the same column, and having a cell height dimension along the y axis equal to the cell height dimension of the focal cell region located in the same row. Region 86 is a "column-focal region", having a cell height dimension along the y axis equal to the cell height of a context region located in the same row, and having a cell width dimension along the x axis equal to the cell width dimension of the focal cell region located in the same column.

b. A degree of interest (DOI) function determines the cell region sizes in table image 80.

Cell regions selected to be in focal region 84 are cell regions that have a higher "level of interest" than other cell regions. For example, a system user may select a focal region of cells because those cells have data represented therein that are of a higher level of interest to the system user than the other cell regions in the table image at a particular time. The level of interest in cell regions is represented in each dimension by a "degree of interest" ("DOI") function that indicates the interest level of each cell region in that dimension. The DOI function can be implemented in any manner suitable for taking as an argument a cell number in a given dimension and returning the interest level of that cell. A simple implementation of the DOI function is an array that is as long as the number of cells in that dimension.

In its initial state, each entry has an initial value of zero, indicating that each cell has the same interest level, and therefore the amount of space, in table image 80 in that dimension. When a focal region is selected, then the array representing the DOI function for each dimension is changed to reflect the interest level for that cell. For example, the cells that are selected as part of the focal region are updated to have a value of one (1).

Figure 8:
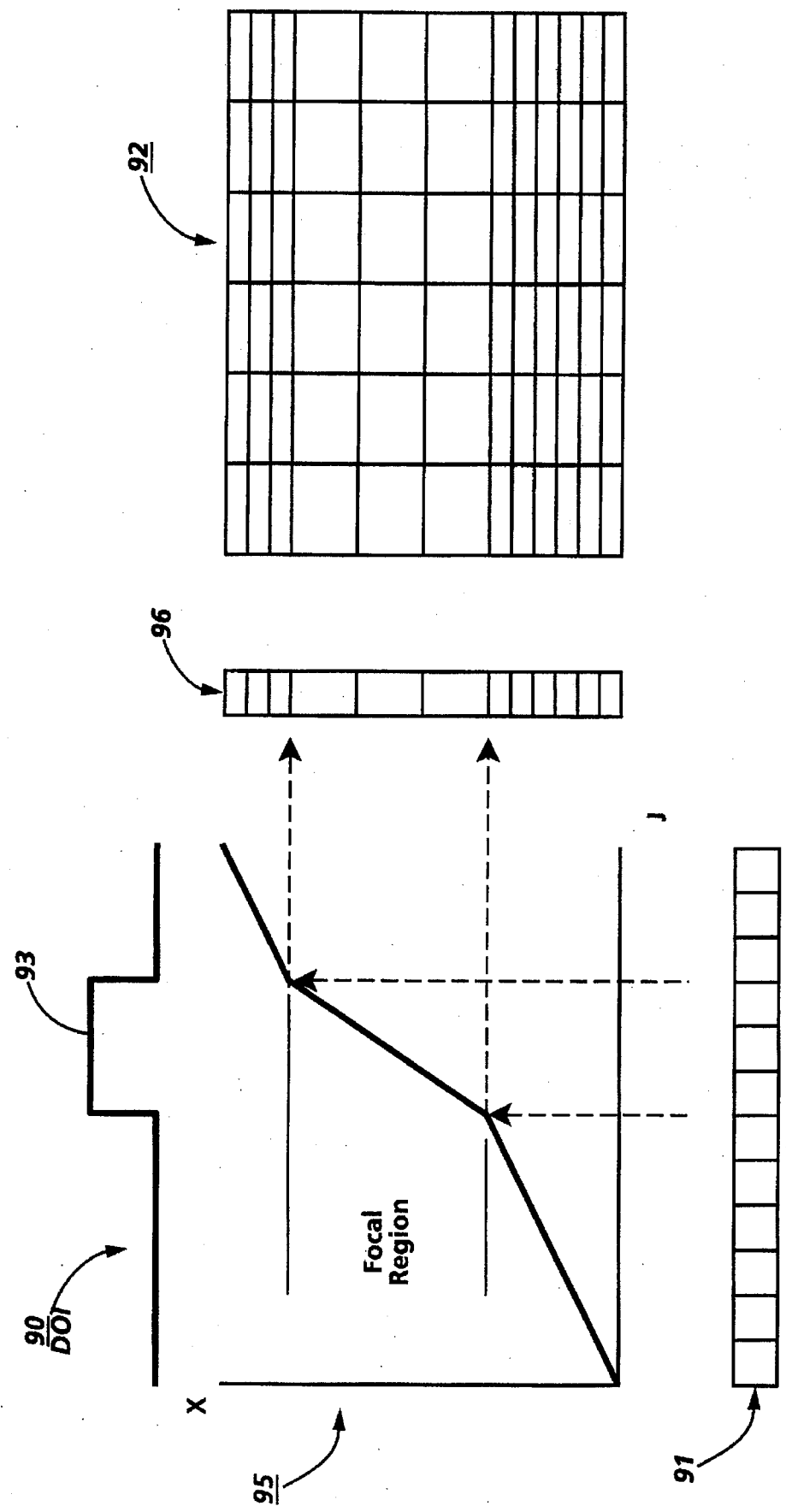
FIG. 8 illustrates the mapping of a degree of interest function from a natural cell region size to a focal region according to the method of the present invention.

There is a DOI function for each dimension of an n-dimensional table, and each function is independent of all of the others. FIG. 8 schematically represents degree of interest function 90 for one dimension (the row dimension) of table image 92. DOI function 90 is aligned with the x axis of graph 95. Table image 92 has twelve rows, represented by region array 91, also aligned with DOI function 90 the x axis of graph 95. Pulse 93 of DOI function 90 indicates the level of interest for a focal cell region in the row dimension of table image 92, and spans three rows. Graph 95 represents a "transfer function" for allocating the proper size for each row focal cell region, and for determining the size of the remaining cell regions in the row. The results of the allocation can be seen in the single column 96, and table image 92 shows the results of the propagation of the allocated cell region sizes in column 96 across all columns.

Figure 9:
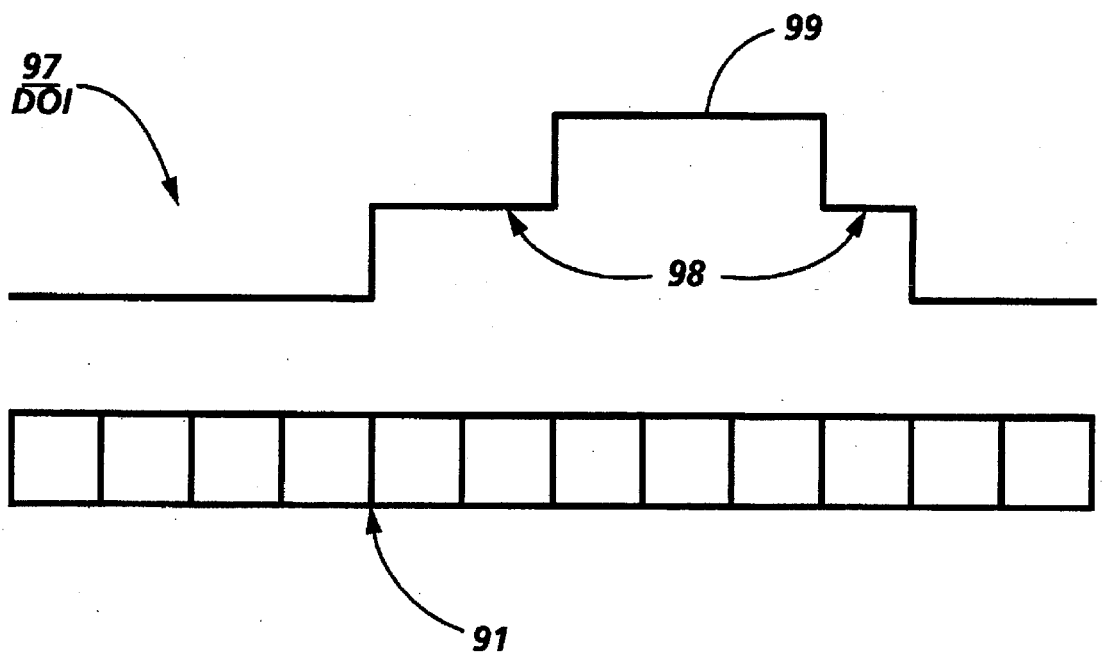
FIG. 9 graphically illustrates a three level degree of interest function.

Using a degree of interest function to represent a level of interest in a cell region in one dimension permits introducing multiple levels of interest in each dimension. FIG. 9 shows three-level DOI function 97 having interest levels 98 and 99 to be applied to the same 12-row table image represented by region array 91. For any level DOI functions, the "level" corresponds to the number of different-sized "interest" cell regions that will be produced, plus one for the context, or non-focal, region. Thus, in the case of DOI function 90 in FIG. 8, there are a total of two cell sizes in one dimension: focal and context. In three-level DOI function 97, there will be three cell sizes in the dimension to which the DOI function applies: the largest focal cells representing the highest level of interest, intermediate-sized focal cells for the second level of interest, and the smallest context or non-focal, cells for the third level of interest.

Figure 10A:
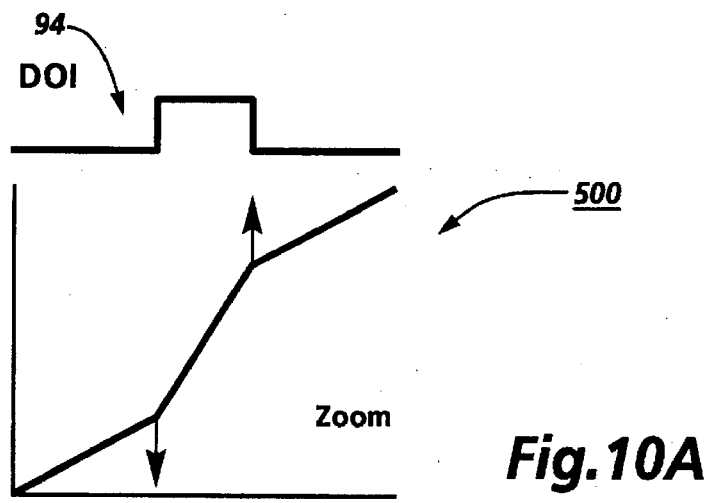
FIGS. 10A, 10B and 10C illustrate illustrates the affect on a single level degree of interest function from the manipulation of the focal region in the table image in three ways.
Figure 10B:
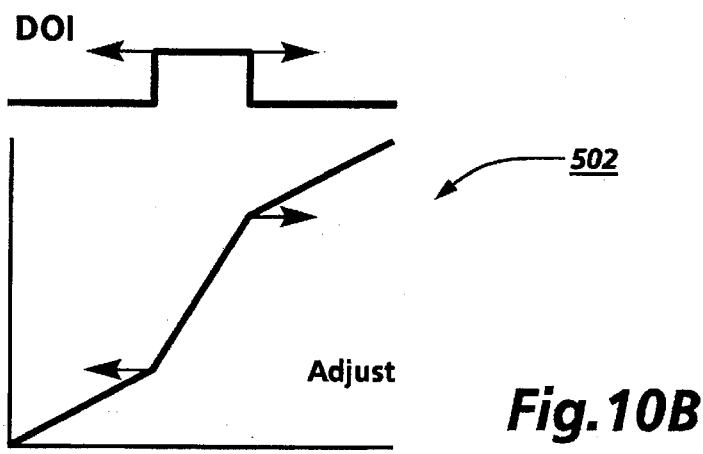
Figure 10C:
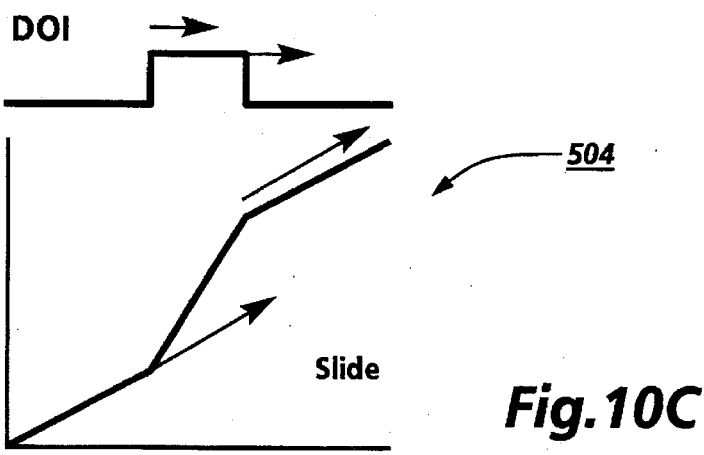

Use of a degree of interest function also allows for convenient manipulation of focal cells once produced in a table image. Three forms of manipulation are supported in the illustrated embodiment, and they are schematically illustrated in FIGS. 10A, 10B and 10C. In FIG. 10A, DOI function 94 is a square pulsed, single level DOI function similar to DOI function 90 in FIG. 8. A "zoom" focal region manipulation, represented by chart 500, changes the amount of space allocated to the focal region without changing the number of cell contained in the focal region, thus increasing the width and height of the focal region. An "adjust" focal region manipulation, represented by chart 502 in FIG. 10B, changes the amount of contents viewed within the focal region without changing the size, or amount of space allocated to, the focal region, thus "pulling" more cells into the focal region. A "slide" focal region manipulation, represented by chart 504 in FIG. 10C, changes the position of the focal region within the table image while keeping the size, or amount of space allocated to, the focal region the same, thus giving the perception of "sliding" the focal region around the table image in the manner analogous to an optical magnifying lens. In addition, a coordinated adjust-zoom operator has also been implemented. It provides for increasing or decreasing the number of cells in the focal region without affecting their individual size, meaning that the total focal region expands or contracts sufficiently to fit a new number of focal cell regions each having the same size as before the operator was invoked.

c. The operation of the method for producing focal cells in the table image.

Figure 11:
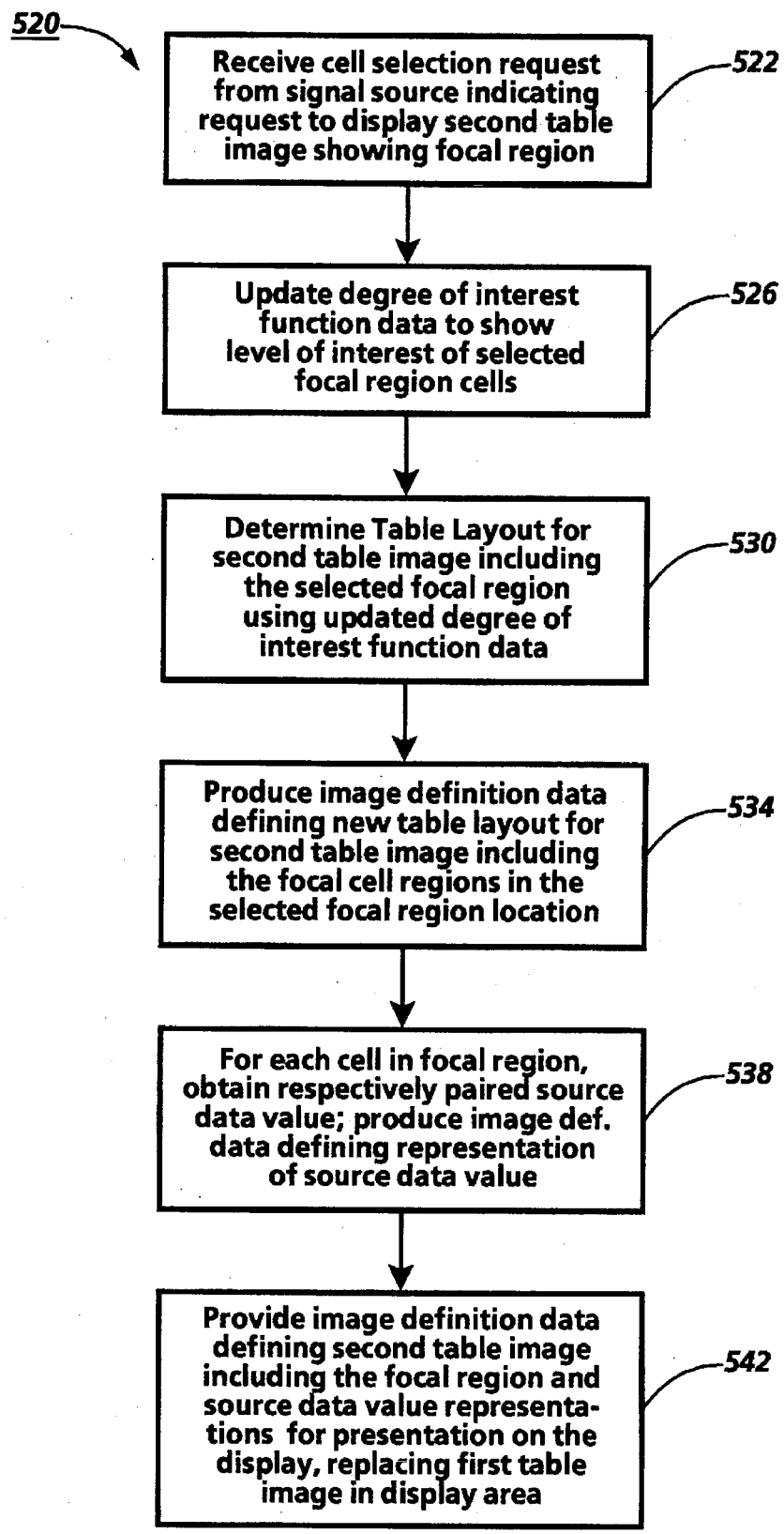
FIG. 11 is a flow chart illustrating the steps of producing a table image including a focal region according to the method of the present invention.

FIG. 11 is a flowchart illustrating the general steps of the focus plus context method 520 of the present invention. The implementation illustrated in FIG. 11 assumes that a first table image is displayed in the display area, and that an input signal interacts with the first table image for selecting at least one cell region to become the focal region. However, the focus plus context method of the present invention may operate independent of a prior-displayed table image. In addition to having information about the available display space for the output table image, the identification of a single cell region that is to become the focal region is sufficient input for operation of the method, and this may be accomplished without actual display of a first table image. Moreover, the computations performed with respect to laying out the output table produced by the method of the present invention may be independent of a table layout for a currently displayed table, especially when a predetermined "natural" focal cell region size and output table size are assumed by the method.

A signal is received from a signal source in box 522 indicating a request to display a second table image having a focal region selected by indicating at least one cell region of a first table image displayed in the display area. In response to the image display request, the DOI function data for each dimension is updated, in box 526, to show the at least one selected cell region as having a first level of interest. Then, the four cell region sizes for the new table layout of the second table image are determined using the updated degree of interest function and natural cell size data for each dimension of the table, in box 530. In box 534, the image definition data defining the new table layout including the selected focal region is produced for the second table image. Box 538 includes traversing the underlying nD data array and rendering the source data values in the focal cell regions of the second table image. In box 542, the image definition data defining the second table image is provided to the output circuitry of the system for display.

Which additional source data values are rendered is an implementational choice. Depending on the nature of the underlying data, non-focal cells may now be too small to adequately hold source data values rendered as character display features, and so they may be omitted on the assumption that the selection of the focal region indicated the only cells of interest. Or the character display features of the source data values may be revised in order to fit into the respective destination cell region size. Or as noted below in part B.2.d, focus plus context method 520 may be combined with any of the graphical representation methods 200, 202, or 204 in such a way as to render each source data value as a graphical representation in the non-focal cell regions.

Table 4 provides pseudo-code for the illustrated embodiment describing the component steps of box 530 for determining the cell sizes in one dimension according to the DOI function and the "natural" measurement of the cell in the given dimension. Essentially, the process described in table 4 allocates the cells proportionally across the dimension. First, how many cells at the focal level of interest is determined, and each of those cells is allocated its natural size. Then the total space required by the focal cell regions is subtracted from the total amount of space in the given dimension. The space remaining in the dimension is divided equally among the rest of the cells in that dimension.

TABLE 4

Pseudo Code For Laying Out A Dimension doi-seqr: a DOI-seqr that describes the warping on a given axis.
sizes(N): a vector of N cells, where N is the number of cells in the given dimension. The values contained are the "natural" measurement of the cell in the given dimension (i.e. width for horizontal and height for vertical)
array(N): a vector of the position along the given axis that the cell should be positioned at.
BODY:
integrate the DOI function
determine how to allocate area based on available space and user options
assign a location to first cell
for each cell in order
    examine the "natural" space requirement of the cell
    examine the level of interest in the cell
    determine how much space to give to the cell
    assign a location to the next cell at least this much space further on Table 5 below provides pseudo code for drawing the new table layout, as represented in box 534.

TABLE 5

Pseudo Code For Draw-Table Procedure x-positions: a vector of length N + 1
widths: a vector of length N
y-positions: a vector of length M + 1
heights: a vector of length M
x-positions = layout-dimension(x-doi-seqr, widths(n))
y-positions = layout-dimension(y-doi-seqr, heights(m))
iterate x in x-positions
    draw-horizontal-line(x)
iterate y in y-positions
    draw-vertical-line(y)
iterate j from 1 to N
iterate i from 1 to M
    draw_cell(i,j,widths[i], widths[j])

Table 6 provides pseudo code implementing a DOI function.

TABLE 6

Specific Implementation: 2-Level DOI

*The specific doi-seqr can keep track of location and size of each foci, and do straightforward integration, etc.
DOI-Seqr:

number_of_pixels_available: number
number_of_cells: number
foci: list of (start,stop)
Layout Procedure:

determine the total space requirement of all focus cells
subtract this from total space available
divide this leftover by the number of context cells and truncate
iterate through cells in order:

give focus cell its requested space
give context space the calculated amount for context cells Although not shown in table image 80 of FIG. 7 because of limitations in rendering drawings showing grey level values, visual differentiation between the focal, context, and the row- and column-focal regions may be further enhanced in the display area by using different grey level values as background color in the appropriate cell regions on display devices that support this feature. For example, focal regions can be shown with a white background, context areas may have a medium to dark grey background, and the row- and column-focal regions may have a light to medium grey background. Alternatively, different saturation, chroma or lightness variations of a single hue color, or of harmonious hue colors may also be used as background in the appropriate cell regions to provide such visual differentiation, although the use of color should be selected carefully if the focus plus context method is combined with the graphical representation method, as described in part B.2.d below.

d. The operation of the method for combining focal cells with graphical data representations in the table image.

The advantages of producing table image 10 of FIG. 1 presenting graphical representations of the source data items in nD data array 810 may be further enhanced by integrating method 520 of FIG. 11 with any of methods 200, 202, and 204 of FIGS. 4, 5, and 6, respectively. In combination, the resulting method, shown in the flowchart of FIG. 12, provides a novel table image presentation technique having a wide variety of applications and contexts.

Figure 12:
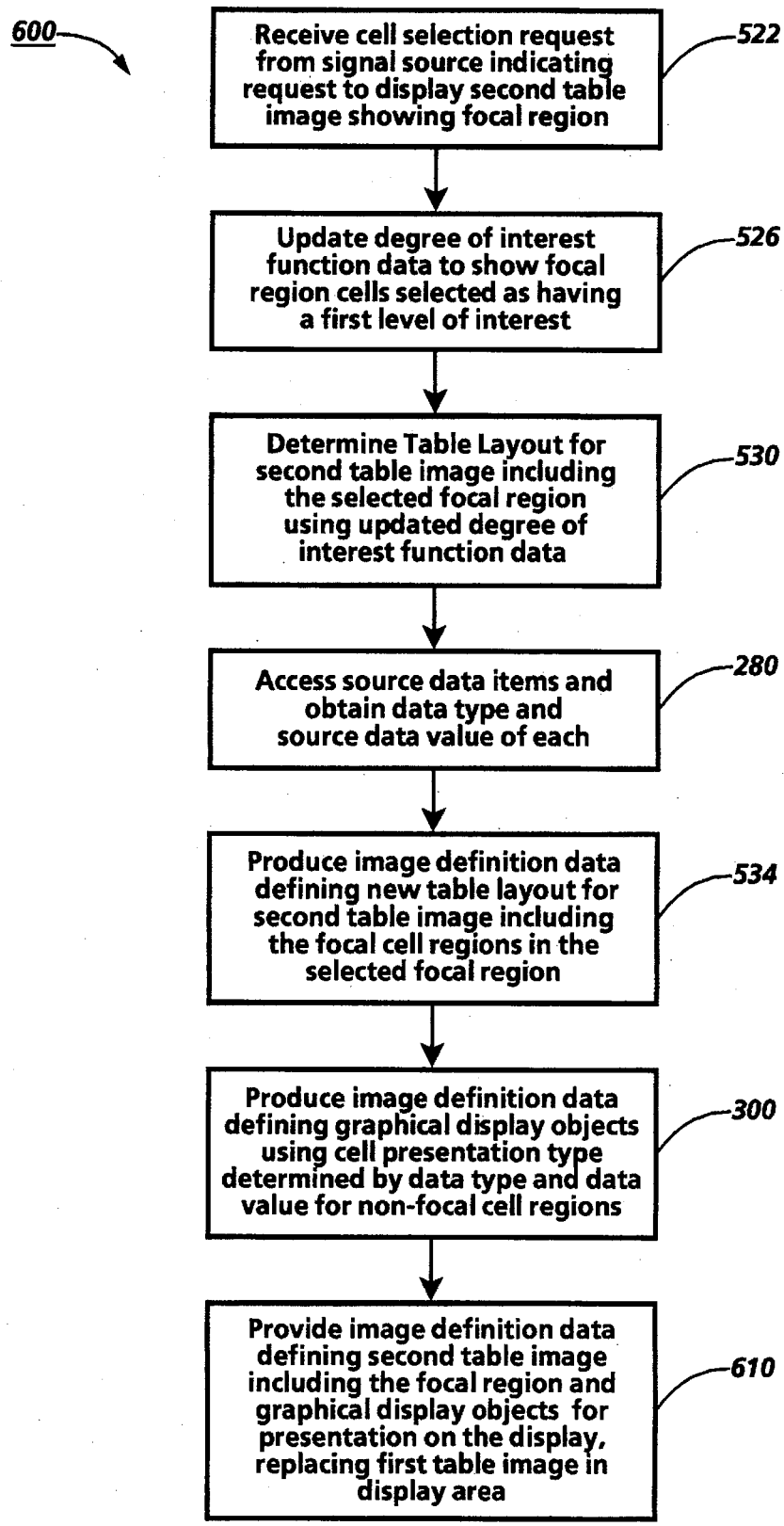
FIG. 12 is a flow chart illustrating the steps of producing a table image including a focal region and having a graphical representation of the underlying data in the cell regions according to the combined methods illustrated in FIGS. 4 and 11.

Since the steps shown in FIG. 12 have been discussed in detail earlier with respect to each individual method, they will not be discussed in further detail here. Those of skill in the art will appreciate that, when both focus plus context and graphical representation features are combined, processing performance efficiencies can be obtained by caching a table image that is entirely in context form showing only graphical representations. For processes such as changing focal regions and where only the display of a single column is affected, such as some of those available through the user interface described below in part B.4, a cached table image in context form significantly reduces the amount of computation and graphic formatting necessary to repaint the table image in the display area. Such user controlled processes include hiding and revealing columns, and changing cell presentation type parameters.

The application of the method of the present invention combining the focus plus context technique with the use of graphical representations of data is particularly useful for large table images representing large nD data array structures, as is described in more detail in part B.3 below. The application of the combined method may also be useful for complex data structures, such as data structure 860 illustrated in FIG. 3, regardless of the size of the data structure, when the direct symbolic representation of the underlying data occupies more space than a single display area. It has already been noted that the graphical representation of complex data structures provides a space-efficient utilization of the display area. The system user's ability to control the presentation of focal regions where the complex underlying data can be directly represented only as needed, according to the user's interest level, further enhances the utility of the present invention.

3. The application of the method of the present invention to large data structures that produce large multiple-image table images.

The method of the present invention is particularly suited for producing table images representing large bodies of data. In conventional table-processing applications such as spreadsheet applications, the data in a very large data array cannot be completely represented in one image, and various techniques are provided to the system user to gain access to data in portions of the spreadsheet or table image that are not currently visible in the display area. Techniques such as scrolling through a table image to bring new cells into the display area or paging through multiple images require excessive amounts of time, and may result in the loss of column and row identifiers that provide navigational clues for efficiently locating a desired item of data.

Figure 13:
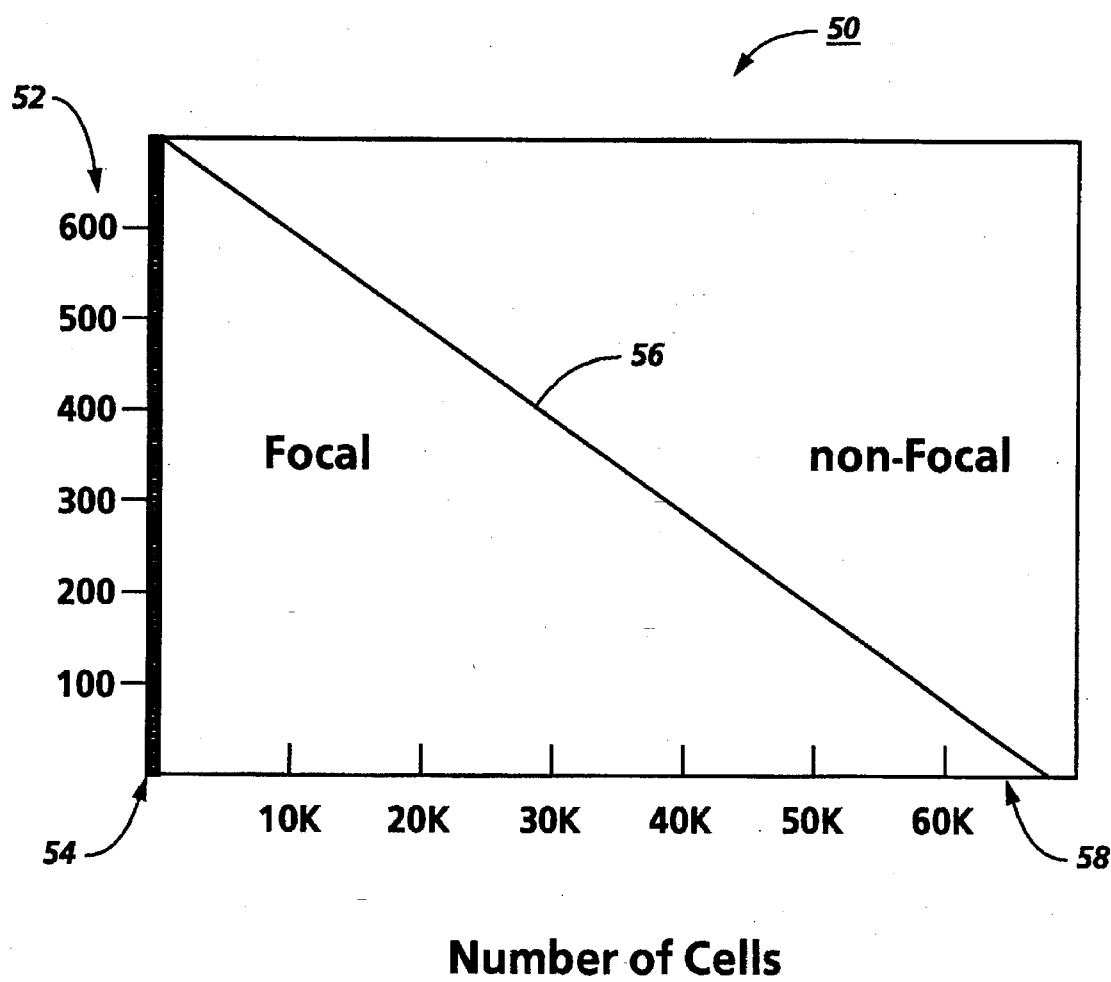
FIG. 13 is a graph illustrating the advance in the number of cell regions able to be represented in a single table image according to the methods illustrated in any of FIGS. 4, 5, or 6.

In a simple computation it can be shown that, in a spreadsheet having individual cells of 100 pixels by 15 pixels, a maximum of 660 cells can be displayed on a 19-inch display. Graph 50 in FIG. 13 shows the advance in the size of a table image as more cells become context cells and use an indirect graphical method for representing the underlying source data. The y axis 52 shows the 660 cells computed for a typical 19-inch display. Grey strip 54 shows the displayable regions of typical spreadsheet where all cells are focal, containing a direct representation of the underlying data. Line 56 shows the progressive advancement in the number of displayable cells as more cells are converted from focal to non-focal. It can be seen from graph 50 that the method of the present invention can show about 68,400 cells in a single table image, or over two orders of magnitude more cells than in a conventional spreadsheet table image.

Figure 15:
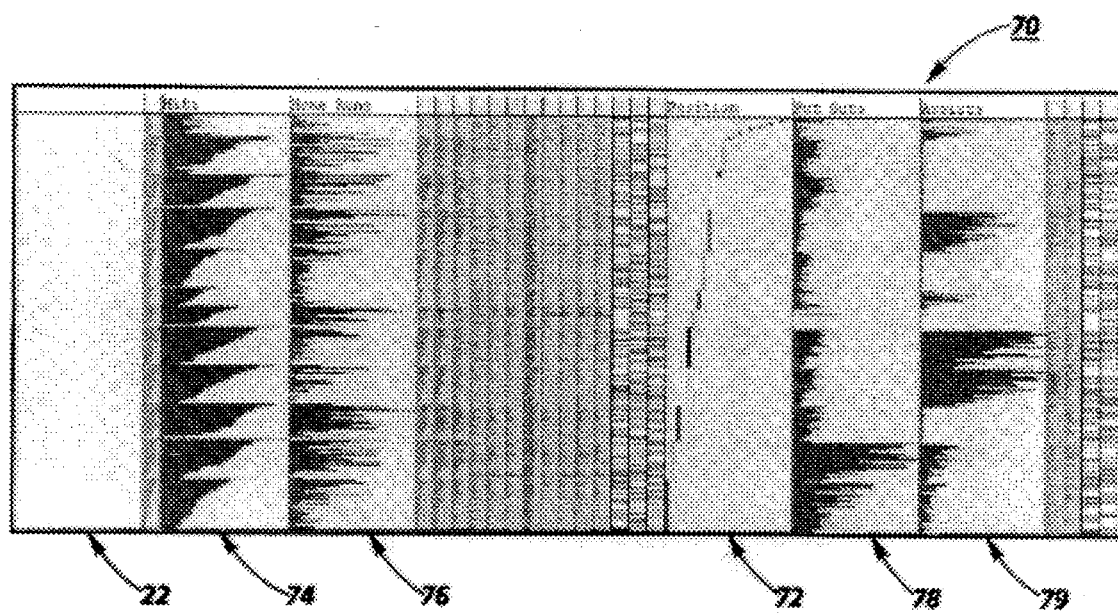
FIG. 15 is display screen showing a second table image produced by the illustrated embodiment of the method of the present invention, according to the method illustrated in FIG. 12.

FIGS. 14 and 15 show table images 60 and 70, respectively, produced by the method of the present invention. Each table contains 323 rows by 23 columns, for a total of 7429 cells. This is 11 times, or an order of magnitude, more than the estimated maximum of 660 cells for a conventional table, as shown in graph 50 of FIG. 13. The data used and presented in table images 60 and 70 are performance and classification baseball statistics for all major league baseball players from 1986 and 1987. FIG. 14 shows table image 60 in display area 180 with several features of the user interface of the illustrated embodiment. Table Image 60 shows several focal regions such as focal region 62. To assist in understanding the data presented in focal region 62, column identifier "Avg." and row identifiers 23 showing player names have entries, while column identifiers and row identifiers are omitted in non-focal and semi-focal regions. Two cell regions 26 and 27 are marked in FIG. 14 as examples of the direct symbolic representation of data in the cell region 27 of the focal region and the indirect, graphical representation of data in the cell region 26 of the context area. Table image 60 also shows column 64 as a sorted column, sorted in descending order by "career average".

Table image 70 in FIG. 15 illustrates some of the exploratory data analysis techniques that may be accomplished using the method of the present invention. The quantitative performance of the baseball players is explored by sorting column 74 ("Hits") and then col. 72 ("Position"). This shows the distribution of hits within each field position. By understanding and decoding the graphical representation used for each of the field positions in column 72, the relationship between field position and hits is immediately apparent. In addition, other relationships in the data between field position and other components (variables) also emerge, as can be seen by the aggregation of high numbers of "put outs" and "assists" in columns 78 and 79, respectively.

Thus, upon visual inspection of table images 60 and 70 in FIGS. 14 and 15, the human perceptual and cognitive abilities of a system user permit, or may even require, the aggregation of individual graphical display objects in individual cells into global patterns and shapes, typically but not necessarily by columns. If cell presentation types have been carefully designed and selected for the data types of the underlying data, the patterns and shapes will "emerge" from the display of the individual graphical display objects as the system user manipulates the arrangement of the rows or columns according to the facilities provided by the features of the user interface. This provides the system user with the ability to detect, understand, and appreciate information about the underlying data that in fact is likely not to be directly contained in the data. Note, however, that the graphical patterns that emerge from the aggregation of individual graphical display objects in no way affect the basic definitions of display feature and display object as referring to any human perception produced by the display. The individual graphical display object in each cell may not be directly perceptible by the system user because of the limits of human perceptual ability to perceive small details, but each display feature of each graphical object is physically represented by signals in the image, and thus the graphical display object and its associated display features are still "included" in the image.

4. The user interface.

The illustrated embodiment of the method of the present invention has been implemented with a multi-functional user interface to enable the system user to manipulate components of table image 10 so as to reveal patterns in the data and to control the selection and location of focal regions within the table image. The combined user interface features enable the system user to perform exploratory data analysis in a highly interactive and natural manner. The user interface features also permit fluidly adjustment of the single coherent view of the table between the symbolic, or direct, and graphical, or indirect, data representations, which is an especially important advantage with respect to large table applications.

Figure 16:
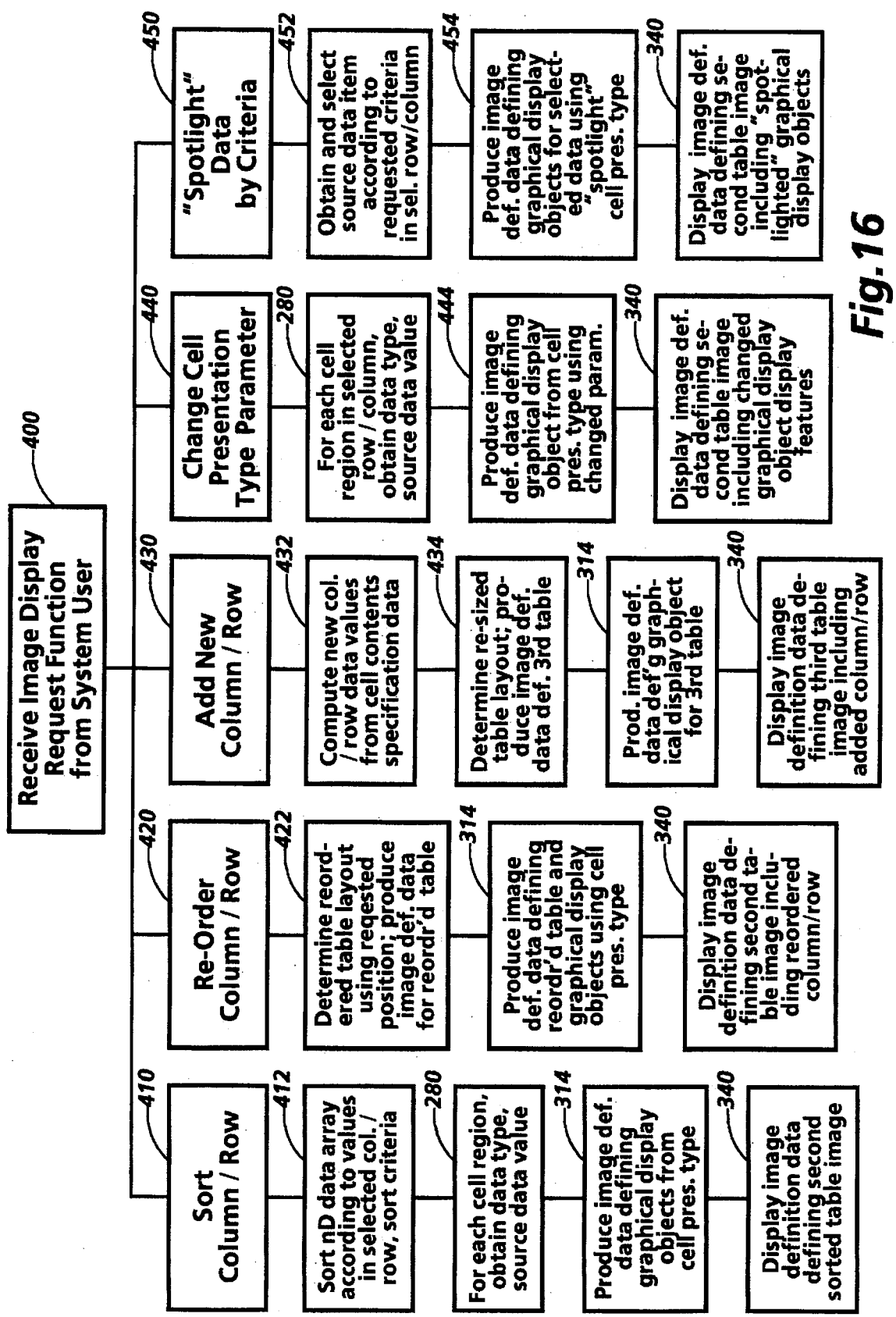
FIG. 16 is a flow chart illustrating the steps of various user-controlled processing features of the user interface of the present invention.

In the illustrated embodiment, interaction is based on a small number of keyboard commands and a pointer gesture scheme. Two mouse buttons are used respectively for touching functions and grasping functions. Pointer gestures are performed using the touch button, and objects are dragged using the grasp button. Focal manipulation is supported using control points on the cells and pointer gestures. Table 7 below summarizes the major features of the user interface. The flowchart in FIG. 16 presents the general processing steps for accomplishing five of the supported operations on table columns (or table rows if the rows contain the components, members, or variables of the data.) The processing steps shown in FIG. 16 will not be discussed in further detail here.

TABLE 7

Summary of User Interface Features in the Illustrated Embodiment

| Function | Image Display Requests By User | System Response |
| --- | --- | --- |
| Focal: Add | Grasp a cell in the context; system responds with permitting drag of control point; user drags control point for adjust-sooming | Displays New Focal region; re-displays Table Image |

TABLE 7-continued

Summary of User Interface Features in the Illustrated Embodiment

| Function | Image Display Requests By User | System Response |
| --- | --- | --- |
| Focal change (slide) | new focal region; touch any region in the context area (slides current focus to new location;, touch any region in the context area (slides current focal region to new location) | Changes location of focal region in Table Image; re-displays Table Image |
| Zoom Focal Region | Grasp the control point at the upper-left corner cell of the table image | Recomputes cell size from a new DOI function to zoom all displayed cells; re-displays Table Image |
| Adjust Focal Region | Grasp the control point on a selected focal region | Changes the number of cells viewed within selected focal region without changing focal region size; re-displays Table Image |
| Column Hide/Re-Size | Hold down mouse button and drag mouse to left within a selected column reduce size or hide column; to right to enlarge or reveal hidden column | Resizes, hides, or makes visible selected column and re-displays Table Image |
| Column Reorder | User grasps column identifier region and moves it to new table position | Reorders Column to requested new position and re-displays Table Image |
| Column Add | User initiates by entering cell contents specification data in display area, and touching requested column position | Adds Column with specified contents in reqnested new position and re-displays Table Image |
| Column Sort | User holds down mouse button and drag mouse upwardly within a selected column for ascending order sort; downwardly for descending order sort | Sorts the selected column using requested sorting order and re-displays Table Image |
| Change Column Display Parameter | User initiates by double clicking on a column; System presents Dialog Box showing parameter options; user selects parameters in box; see e.g, FIG. 17 | Changes cell presentation type for requested column using requested parameter and re-displays Table Image |
| Spotlight Data | User initiates by double clicking on a column; System presents Dialog Box; see e.g , FIG. 18 | Searches data array for requested data values; changes presentation type, and re-displays Table Image |
| Spotlight to Focal region | Keyboard command to display spotlighted data in focal region. | Performs focal routines for defining a new focal region and re-displays Table Image. |

Two additional focal manipulation techniques are also provided. One, requested using keyboard commands, allows for hiding or removing all focal spans in each dimension. Another is a function combining the zoom feature with the adjust feature in a coordinated manner. This coordinated adjust-zoom function was found to be a useful and very efficient operator thorugh actual use of the illustrated implementation of the present invention. It provides for increasing or decreasing the number of cells in the focal region without affecting their size, meaning that the total focal region expands or contracts sufficiently to fit a new number of focal cell regions each having the same size as before the operator was invoked.

The function labeled "Change Column Display Parameter" in Table 7 provides the system user with the ability to alter certain display features, or parameters, of the cell presentation type. For example, for quantity data types where the cell presentation type uses a black bar having a length representative of the source data value, the system user may choose how the bar is to be scaled to fit the available space in the cell region, including whether the left edge is set at zero or the minimum value of the source data values of the respectively paired source data items. For category data types, the user may, for example, control the number of colors used for the categories and how the colors are used to map from category values. The example popup dialogue box 460 in FIG. 17 is produced in the illustrated embodiment for the baseball statistics table images 60 (FIG. 14) and 70 (FIG. 15) when the user initiates the change parameter function.

Figure 18:
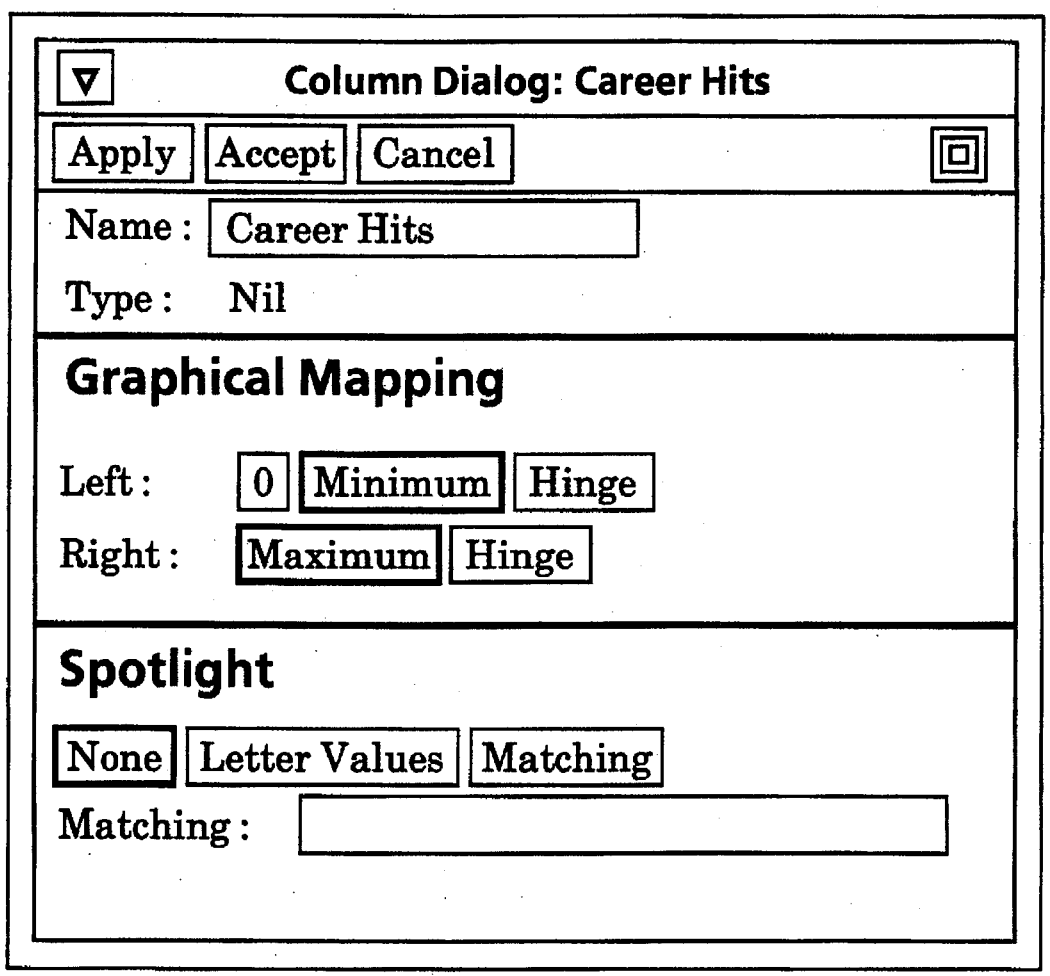
FIG. 18 illustrates a dialogue box for requesting the highlighting of certain source data values in the table image, as provided by the user interface of the illustrated embodiment of the method of the present invention.

The term "spotlight" in table 7 is used to identify a highlighting function permitting the system user to provide data value criteria or a computation specification that may be used to search the underlying data array for source data items having data values matching the data value criteria or computation specification. The matching source data items are then presented in respective cell regions using a new cell presentation type that is similar to but sufficiently different from the cell presentation type used for the remaining data of the same data type so as to provide a visual distinction between highlighted and nonhighlighted data in the table image. Thus, the system user may search for quantity values that match some numerical specification provided, and, in response, the graphical representation of the source data values of the matching source data items will include a display feature that is changed from the graphical representation of the source data values of the non-matching source data items having the same data type. For example, if quantity data in a particular column of the table image is displayed using a black bar, quantity data matching quantities over one hundred (100) may be displayed with a red bar. As a further example, special individual values such as medians or quartiles in the data values may be "spotlighted" according to the system user's data value criteria or a computation specification. The example popup dialogue box 470 in FIG. 18 is produced in the illustrated embodiment for the baseball statistics table images 60 (FIG. 14) and 70 (FIG. 15) when the user initiates the change parameter function.

C. The system environment, system and software product of the present invention

1. The system environment.

Figure 19:
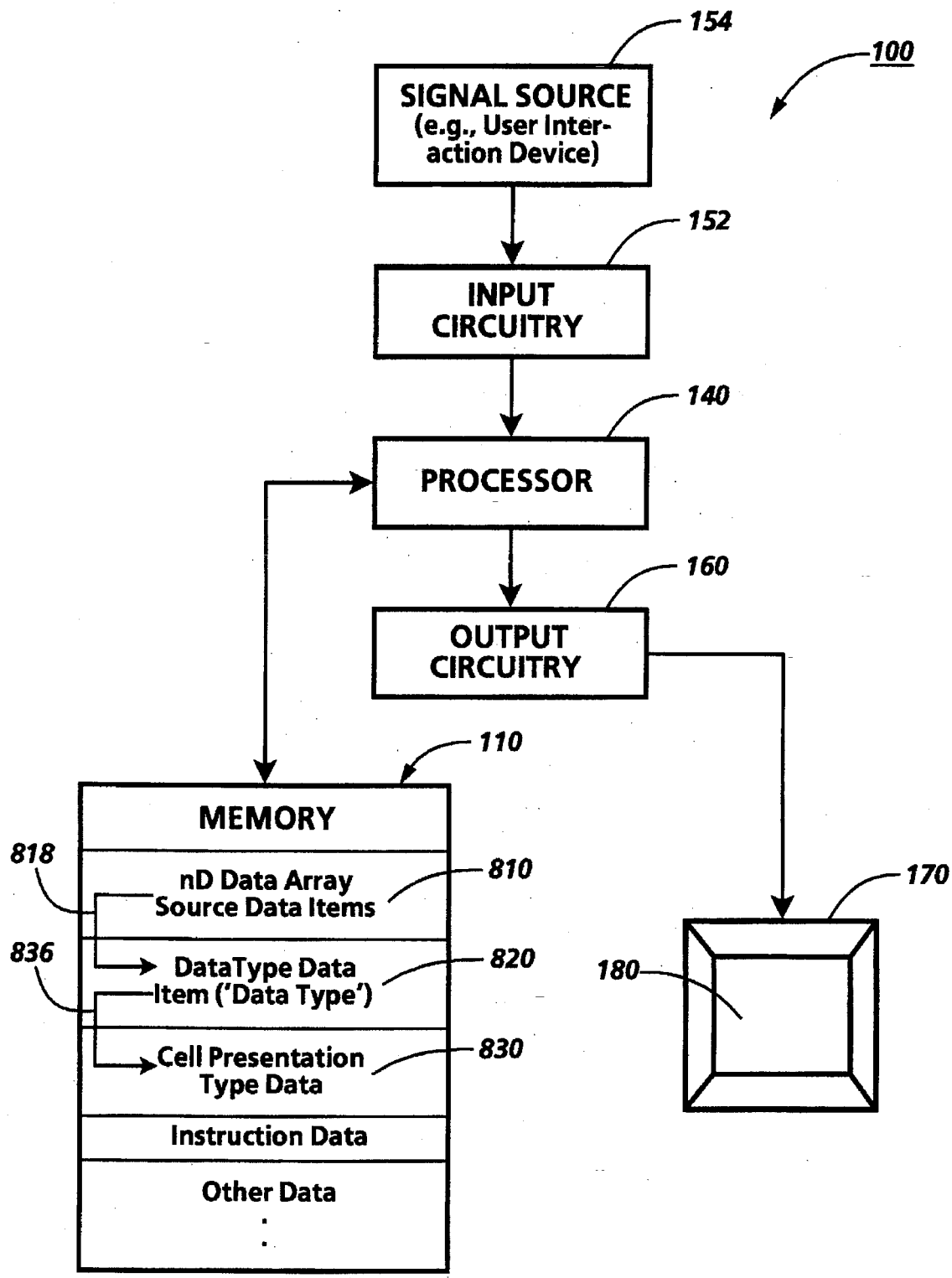
FIG. 19 is a simplified block diagram illustrating the system environment for operating any of the aspects of the method of the present invention.

The method of the present invention operates a variety of processor-controlled systems, each of which has the common components, characteristics, and configuration of system 100 illustrated in FIG. 19. System 100 includes input circuitry 152 for receiving input "request" signals from one or more signal sources 154 indicating image display requests. An image display request may include a request for an operation and information identifying the requested operation, wherein the signal or signals indicate one or more actions by a system user intended to cause performance of the operation. An operation is performed by the system "in response" to a request when the signals received are for indicating a valid request for a valid operation and for causing the operation to be performed. Signals indicating a single complete request may include a combination of any number of actions indicated by the user necessary for indicating a valid request for a valid operation and for causing the operation to be performed. Signals indicating user actions may also include signals indicating the selection or movement of a display object visible to the user in display area 180, signals indicating requests that result in operations being performed by processor 140, and signals that result in processor 140 providing data defining an image to output circuitry 160 for display in display area 180.

Signal source 154 may include any signal producing source that produces signals of the type needed by the method of the present invention. Such sources include a variety of input devices controllable by a human user that produce signals generated by the user, and may also include other devices connected to system 100 for providing such signals, including devices connected by wired or wireless communications facilities, such as through remote or local communications networks and infrared and radio connections. Signal source 154 may also include operations performed by system 100, such as the operating system of a digital computer, or other applications performed by the digital computer.

Signal source 154, connected to input circuitry 152, may include, for example, a keyboard or a pointing device, used by the system user to indicate actions. Suitable pointing devices include, but are not limited to, a mouse, a stylus or pen, and a trackball. The pointing device has circuitry (not shown) for controlling the interaction between the system user and display features and objects presented on display device 170. For example, the pointing device may have buttons (not shown) which when clicked or released result in signals being sent through input circuitry 152. In addition, signal source 154 may be a pen-like or stylus device that can be moved over the display surface display area 180. In the case of a pen-like or stylus device, there may be a pressure sensitive tip switch (not shown) which results in signals being sent through input circuitry 152 when the user presses the tip switch against display area 180, such as, for example, when the system user uses the stylus to make gestures in display area 180. Alternatively, signal source 154 may be a touch sensitive surface of display device 170, for example corresponding with display area 180, such that input circuitry 152 is included within display device 170. The method of the present invention may be implemented in a manner to receive signals indicating a display request from any of these signal sources. Processor 140 is connected for receiving the signals from input circuitry 152.

With continued reference to FIG. 19, system 100 also includes memory 110 for storing data. Processor 140 is connected for accessing the data stored in memory 110, and for providing data for storing in memory 110. Memory 110 stores instruction data indicating instructions the processor executes, including the instruction data indicating the instructions for operating system 100 according to the method of the present invention.

Processor 140 is also connected for providing data defining table image 10 to output circuitry 160 for presentation on display device 170 in display area 180. As noted earlier, with respect to circuitry components, any two such components are "connected" when there is a combination of circuitry that can transfer data from one of the components to the other. Processor 140 is further connected for providing data defining images, produced according to the method of the present invention, to output circuitry 160 for presentation on display 170 in display area 180. In the description of the illustrated embodiment, the display area corresponds to the visible part of the display screen, and the method of the present invention provides for visibly displaying therein table image 10 having graphical display objects (e.g., as in FIG. 1) and table image 80 having a focal region plus context areas (e.g., as in FIGS. 7, 14, and 15). However, the method of the present invention could also provide for displaying the table images produced in a virtual screen or presentation space for a window, or to the area of a buffer for printing or facsimile transmission, or the like.

The actual manner in which the physical hardware components of system 100 are connected may vary, and may include hardwired physical connections between some or all of the components, connections over wired or wireless communications facilities, such as through remote or local communications networks and infrared and radio connections. For example, memory 110 may include memory that is physically connected to processor 140 as local memory, or that is remotely accessible to processor 140 by means of a wired or wireless communications facility. Thus, when it is described above that the method causes processor 140 to access a particular data item, that data item may be stored in a memory device that is remotely located from system 100 but which is accessible to processor 140 by means of the appropriate connections. It is further of importance to note that the range of the physical size of system 100 may vary considerably from a system that includes a very large display device 170 suitable, for example, for electronic whiteboard applications, to a system that includes much smaller desktop, laptop, and pocket-sized or smaller display devices, and the method of operating a system according to the present invention is intended to be operable on systems in each of these physical size ranges.

One embodiment of the method of the present invention has been implemented in the Common Lisp programming language using the Common Lisp Interface Manager (a user interface programming interface), both of which are commercial software products available from Franz, Inc. of Berkeley, Calif., Lucid, Inc. of Menlo Park, Calif., and Apple Computer of Cupertino, Calif. The method has been demonstrated on a Sun Microsystems SparcStation computer running the Unix operating system and the XWindows environment. It will be apparent to those of skill in the art that a wide variety of programming languages and hardware configurations could readily be used in place of those used in the illustrated embodiment based on the description herein without departing from the scope of the invention.

2. The system and software product of the present invention.

The system of the present invention includes a processor that is operated according to any of the methods previously described, and its components, characteristics, and configuration have been described above with respect to system 100 of FIG. 19.

Figure 20:
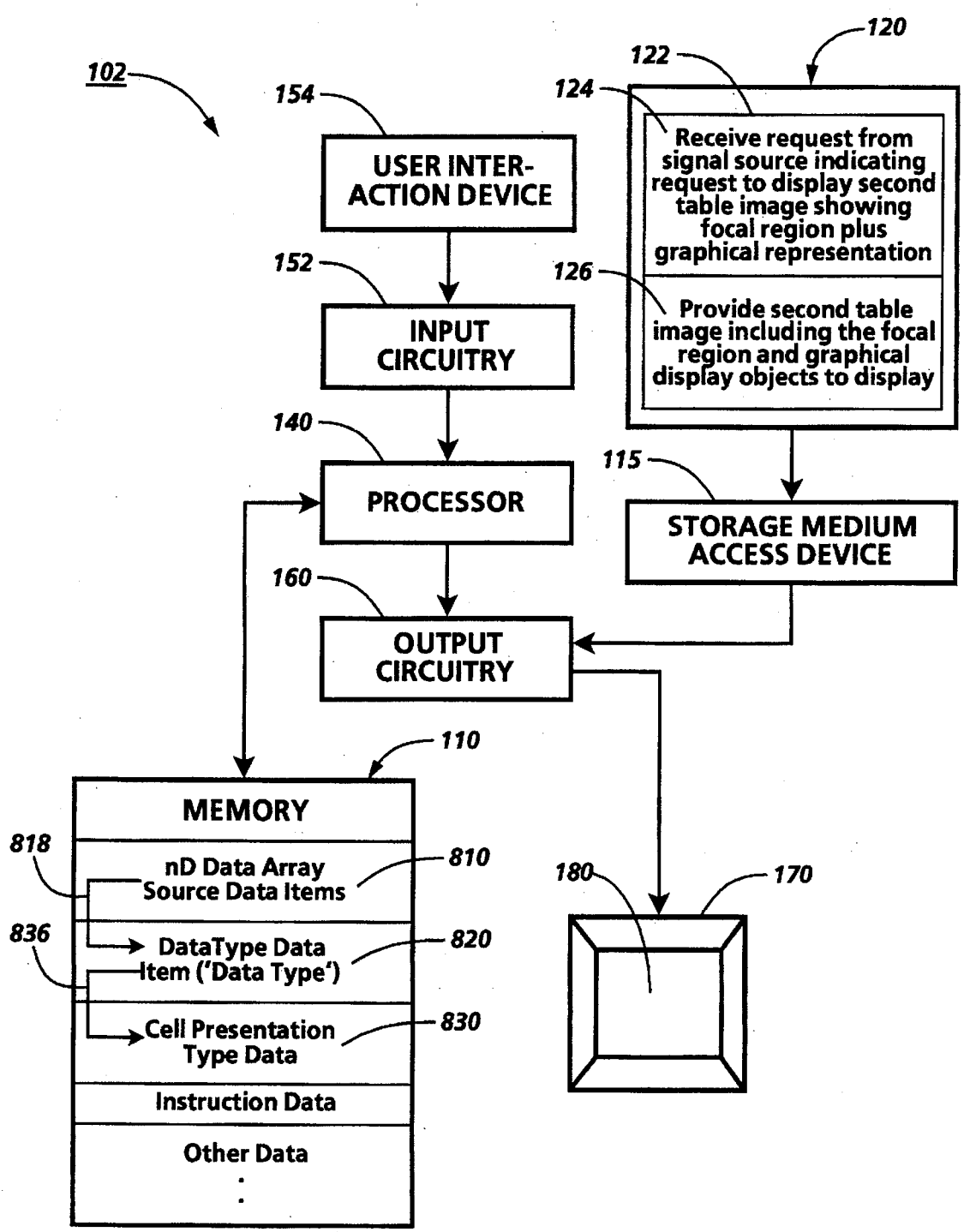
FIG. 20 is a simplified block diagram illustrating a system for operating, and software product for, any of the aspects of the method of the present invention.

FIG. 20 illustrates still another system configuration of the present invention. Components of system 102 in FIG. 20 that are functionally similar to system components in system 100 have the same reference numerals, and will not be described further here. Note that when the method of the present invention is implemented in a system in which the user input device is a pointing or positioning device that eliminates the user's dependence on a keyboard device for the entry of signals, the system of the present invention may be a pen- (stylus-) based computing system, or a small, notebook- or palm-sized processor-controlled system having a small display area for which a keyboard component is not suitable or not included.

System 102 includes storage medium access device 115. Storage medium access device 115 provides data from a data storage medium to processor 140. FIG. 20 also shows software product 120, an article of manufacture that can be used in a system that includes components like those shown in FIG. 20. Software product 120 includes data storage medium 122 that can be accessed by storage medium access device 115. Data storage medium 122 could, for example, be a magnetic medium such as a set of one or more floppy disks or PCMCIA memory storage, an optical medium such as a set of one or more CD-ROMs, or any other appropriate medium for storing data. Data storage medium 122 stores data that storage medium access device 115 can provide to processor 140.

In addition to data storage medium 122, software product 120 includes data stored on storage medium 122. The stored data include data indicating instructions 124 and 126, which can be executed to produce and display a table image similar in format to table images 60 (FIG. 14) and 70 (FIG. 15) in display area 180, as, for example, by the instructions represented in the boxes of FIG. 12.

D. Additional Considerations.

1. Application in a 3D environment

Each of the aspects of the method of the present invention may be applied in the domain of three dimensions (3D). A 3D cube of cell regions may be generated, whereby each pair of dimensions is capable of visualization and manipulation according to the techniques described above. 3D motion control techniques can be used to navigate around the 3D table, or, alternatively, 3D object manipulation techniques can be used to move the 3D table, in order to view a different pair of dimensions.

In conclusion, the method of the present invention provides a time- and space-efficient mechanism for visualizing and analyzing large bodies of data suitable for representation in a table format.

It is evident that there has been provided in accordance with the present invention, a method that fully satisfies the aims and advantages hereinbefore set forth. While this invention has been described in conjunction with a specific embodiment thereof, it is evident that many alternatives, modifications and variations will be apparent to those skilled in the art. Accordingly, the invention as herein described is intended to embrace all such alternatives, modifications and variations as fall within the scope of the appended claims.

What is claimed:

1. A method of operating a machine to present a graphical view of data in a tabular format; the machine including:

output circuitry connected to a display having a display area for presenting images;

a processor connected for providing images to the output circuitry; and memory for storing data; the data stored in the memory including instruction data indicating instructions the processor executes;

the processor being further connected for accessing the data stored in the memory;

the method comprising:

operating the processor to obtain a plurality of source data items included in an n-dimensional (nD) data array stored in the memory; respective ones of the plurality of source data items in a first dimension of the nD data array each being referred to as a case data item and each indicating a set of source data items in a second dimension of the nD data array; each source data item included in the set of source data items in the second dimension being referred to as a variable data item and indicating variable information about the case data item; the set of variable data items for each case data item being identically ordered with respect to the variable information provided about the case data item such that a first variable data item for a first case data item indicates first variable information about the first case data item and a first variable data item for a second case data item indicates first variable information about the second case data item; each of the plurality of first variable data items indicated by respective ones of the case data items being referred to as a first column data item; each source data item stored in the nD array having a source data value indicating a direct representation of information about the respective source data item;

operating the processor to determine a graphical display object for each respective first column data item; each graphical display object representing an indirect graphical representation of the source data value indicated by the respective first column data item; each graphical display object having display features in common with each other graphical display object representing a first column data item; each graphical display object further having a display feature, referred to as a value display feature, representing the source data value of a respective first column data item; a value display feature of a first graphical display object visually distinguishing the first graphical display object from a second graphical display object representing a respective first column data item having a different source data value;

operating the processor to produce image definition data defining an image, referred to as a table image, for presentation in the display area; the table image defining a two-dimensional (2D) region in the display area for displaying the source data values of the plurality of source data items included in the nD array; the table image including a plurality of cell regions arranged in a two-dimensional (2D) grid of horizontally-arranged cell regions referred to as rows and vertically-arranged cell regions referred to as columns; a number of rows in the 2D grid being determined according to the respective case data items in the first dimension of the nD data array; a number of columns in the 2D grid being determined according to a number of the variable data items included in each set of variable data items in the second dimension of the nD data array; each cell region in the table image being paired with a respective source data item in the nD data array;

operating the processor to produce image definition data defining each graphical display object representing a respective one of the plurality of first column data items; each graphical display object having size dimensions suitable for presentation in a respective one of the cell regions in a first column of the table image;

operating the processor to present the table image in the display area and to present the graphical display objects in respective ones of the cell regions in the first column of the table image; the table image showing in the first column indirect representations of the source data values for respectively paired first column data items; the graphical display objects shown in the first column being visually similar as a result of having display features in common with each other graphical display object; the graphical display objects shown in the first column being visually distinguishable from one another as a result of each having a value display feature representing the source data value of the respective first column data item represented by the graphical display object.

2. The method of claim 1 of operating a machine to present a graphical view of data in a tabular format wherein the source data value of each respective first column data item indicates quantity information;

the display features common to each graphical display object give the perception of a line segment; and the value display feature of each graphical display object is the length of the line segment; the length of the line segment being determined by the quantity information of the respective first column data item;

the first column in the table image showing a line segment in each cell region representing the source data value of the first column data item paired with the respective cell region; the length of each line segment representing the source data value indicated by the first column data item represented by the line segment.

3. The method of claim 1 of operating a machine to present a graphical view of data in a tabular format wherein the source data value of each respective first column data item indicates category information; the source data value being one of at least two categories of information;

the display features common to each graphical display object give the perception of a visible display object boundary feature having an object width dimension suitable for presentation in a cell region; and the value display feature of each graphical display object is an x coordinate position in the cell region determined by the category information of the respective first column data item;

the first column in the table image showing a display object boundary feature in each cell region representing the source data value of the first column data item paired with the respective cell region; the x coordinate position in the cell region of each display object boundary feature representing the source data value indicated by the first column data item represented by the line segment.

4. The method of claim 3 wherein the value display feature of the graphical display object further includes a fill color shown within the visible display object boundary feature and determined by the category information of the respective first column data item; the first column in the table image showing in each cell region a display object boundary feature representing the first column data item paired with the respective cell region; the fill color and the x coordinate position of each display object boundary feature collectively representing the source data value indicated by the first column data item represented by the display object boundary feature.

5. The method of claim 1 of operating a machine to present a graphical view of data in a tabular format wherein the source data value of each first column data item is a composite object data structure; and the display features common to each graphical display object give the perception of an icon display object having size and shape dimensions suitable for presentation in the cell region;

the first column in the table image showing in each cell region an icon display object representing the source data value of the first column data item paired with the respective cell region.

6. The method of claim 1 of operating a machine to present a graphical view of data in a tabular format wherein the source data value of each first column data item is a composite object data structure; and wherein the display features common to each graphical display object include at least one character display feature representing the composite object data structure; the at least one character display feature having size dimensions suitable for presentation in the cell region; the first column in the table image showing in each cell region a character display feature representing the first column data item paired with the respective cell region.

7. The method of claim 1 of operating a machine to present a graphical view of data in a tabular format wherein the source data value of each first column data item is a bit map data structure; and the display features common to each graphical display object give the perception of a reduced version of the bit map data structure having size and shape dimensions suitable for presentation in the cell region; the first column in the table image showing in each cell region a reduced version of the bit map data structure representing the first column data item paired with the respective cell region.

8. The method of claim 1 of operating a machine to present a graphical view of data in a tabular format wherein each respective first column data item stored in the nD data array indicates a data type data item indicating a data type thereof; the processor further obtaining the data type indicated by the respective first column data item; and wherein operating the processor to determine a graphical display object for each respective first column data item includes determining a cell presentation type for each respective first column data item using the data type indicated by the first column data item; the cell presentation type indicating a mapping from the direct representation of a source data value and a source data type indicated by a respective first column data item to the display features indicating the indirect graphical representation of the respective first column data item; and using the cell presentation type to determine the graphical display object representing the respective first column data item.

9. The method of claim 8 wherein a cell presentation type for each different data type indicated by source data items stored in the nD data array is stored in the memory of the machine; each different data type indicating a matching cell presentation type; and wherein operating the processor to determine a graphical display object for each respective first column data item includes automatically determining the graphical display object using the cell presentation type; the processor using the data type obtained for the respective first column data item to obtain the matching cell presentation type stored in the memory of the machine; the graphical display objects shown in the first column of the table image being produced for presentation therein automatically using data stored in the memory of the machine.

10. The method of claim 8 wherein a cell presentation type for each different data type indicated by source data items stored in the nD data array is provided as input by a human user.

11. The method of claim 1 of operating a machine to present a graphical view of data in a tabular format wherein the value display feature representing a source data value of a respective first column data item has a relationship to a size dimension of the cell region; a visually distinguishing characteristic of the value display feature being determined using the size dimension of the cell region; a user perceiving a graphical display object in a cell region in the first column of the table image being able to compare the visually distinguishing characteristic of the value display feature to the size dimension of the cell region to estimate the source data value indicated by the respective first column data item represented by the graphical display object.

12. The method of claim 1 of operating a machine to present a graphical view of data in a tabular format further including, prior to producing the image definition data defining the table image, producing each graphical display object, and presenting the table image showing the graphical display objects, operating the processor to perform a sorting operation using the source data values indicated by the plurality of first column data items and using a sorting order appropriate to the source data values; the sorting operation producing sorted first column data items and rearranging the case data items indicated by the first column data items to produce rearranged case data items;

wherein operating the processor to produce the image definition data defining the table image includes using the rearranged case data items and the sorted first column data items; the first column of the table image showing the graphical display objects presented in an order determined by the source data values indicated by the sorted first column data items and giving a perception of a visual pattern in the graphical display objects shown in the first column; the visual pattern indicating a progression of changes in the source data values.

13. The method of claim 1 of operating a machine to present a graphical view of data in a tabular format further including operating the processor to determine a graphical display object for each of the variable data items indicated by each of the case data items stored in the nD data array;

operating the processor to produce image definition data defining each graphical display object representing a respective one of the plurality of variable data items; each graphical display object having size dimensions suitable for presentation in a respective one of the cell regions in the table image;

operating the processor to present the table image in the display area and to present the graphical display objects in respective ones of the cell regions in the table image; the table image showing indirect representations of the source data values for respectively paired variable data items in all columns of the table image; the graphical display objects shown in a respective one of the columns being visually similar as a result of having display features in common with each other graphical display object in the respective column; the graphical display objects shown in a respective column being visually distinguishable from one another as a result of each having a value display feature representing the source data value of the respective variable data item represented by the graphical display object.

14. The method of claim 13 wherein, when the table image showing in the cell regions the indirect representations of the source data values indicated by the source data items stored in the nD data array has size dimensions too large to be completely displayed in the display area of the display device, operating the processor to produce image definition data defining the table image includes computing a cell region size for each cell region that produces computed size dimensions for the table image small enough to display a complete table image in the display area; and wherein operating the processor to produce image definition data defining each graphical display object includes determining a graphical object size for each graphical display object using the cell region size; the graphical object size for each graphical display object being suitable for presenting the graphical display object in the respective cell region; the complete table image presented in the display area including in the cell regions graphical display objects for all respectively paired variable data items stored in the nD data array and providing a single image, compressed graphical view of data stored in the nD data array.

15. A method of operating a machine to present a graphical view of data in a tabular format; the machine including:

a user input device for receiving signals indicating actions of a machine user;

output circuitry connected to a display having a display area for presenting images;

a processor connected for receiving the signals from the user input device, and connected for providing images to the output circuitry;

memory for storing data; the data stored in the memory including:

instruction data indicating instructions the processor executes; and an n-dimensional (nD) data array including a plurality of source data items each indicating a source data value;

the processor being further connected for accessing the data stored in the memory;

the method comprising:

operating the processor to present a first table image in the display area; the first table image defining a two-dimensional (2D) region in the display area for presenting the source data values indicated by source data items included in the nD array; the first table image including a first plurality of cell regions arranged in a two-dimensional (2D) grid of horizontally-arranged cell regions referred to as rows and vertically-arranged cell regions referred to as columns; a respective one of the first plurality or cell regions being paired with a respective one of the plurality of source data items included in the nD data array for presenting therein the source data value of the respective source data item; each cell region paired with a respective source data item showing at least one character display feature indicating a direct representation of the source data value indicated by the source data item paired with the cell region;

operating the processor to receive user signal data from the user input device indicating an image display request by the machine user to display a graphical view of the direct representations of the source data values shown in a first column of the first table image in the display area; and operating the processor to respond to the image display request from the machine user by presenting a second table image in the display area replacing the first table image; the second table image including a second plurality of cell regions arranged in a two-dimensional (2D) grid of horizontally-arranged cell regions referred to as rows and vertically-arranged cell regions referred to as columns; each of the second plurality of cell regions in a first column in the second table image being paired with a respective one of the first plurality of cell regions in the first column of the first table image;

the first column in the second table image showing a graphical display object in each of the cell regions therein; each graphical display object shown in a cell region in the first column of the second table image representing a mapping from the direct representation of the source data value shown in a paired cell region in the first column of cell regions in the first table image to an indirect graphical representation of the source data value; each graphical display object having display features in common with each other graphical display object shown in the first column of the second table image; the graphical display objects being visually similar, as a result of having display features in common with each other graphical display object shown in the first column;

each graphical display object in the first column in the second table image having a display feature, referred to as a value display feature, representing the source data value that was directly shown in a respective paired cell region in the first column of the first table image; a value display feature of a first graphical display object visually distinguishing the first graphical display object from a second graphical display object representing a different source data value.

16. The method of claim 15 of operating a machine to present a graphical view of data in a tabular format further including operating the processor to receive second user signal data from the user input device indicating a sorting request by the machine user to sort the source data values indirectly represented by the graphical display objects shown in the first column of the second table image; the second user signal data further indicating sorting data indicating a requested dimension sorting order for the source data values; and operating the processor to respond to the second image display request from the machine user by presenting a sorted second table image in the display area showing the graphical display objects of the first column of the second table image in the requested dimension sorting order; the visually distinguishing characteristics of the value display features indirectly representing source data values in the graphical display objects giving a perception to the machine user of a visual pattern in the graphical display objects presented in the first column of the sorted second table image; the visual pattern indicating a progression of changes in the source data values.

17. The method of claim 15 of operating a machine to present a graphical view of data in a tabular format further including operating the processor to receive second user signal data from the user input device indicating a data highlighting request by the machine user to highlight a graphical display object representing a requested source data value represented by the graphical display objects in the first column of the second table image; the data highlighting request including source data value criteria data; and operating the processor to respond to the data highlighting request from the machine user by comparing the source data value criteria data to each of the source data values indirectly represented by a graphical display object in the first column of the second table image to produce selected source data values;

for each selected source data value, producing image definition data defining a graphical display object indicating a changed display feature and referred to as a highlighted graphical display object; the changed display feature visually distinguishing the highlighted graphical display object from a graphical display object in the first column of the second table image not having the changed display feature; and presenting a highlighted second table image in the display area; the highlighted second table image showing the highlighted graphical display objects in the first column; the machine user being able to visually identify each highlighted graphical display object by the changed display feature; the machine user thereby being able to locate data in the first column using the graphical view of the data.

18. The method of claim 15 of operating a machine to present a graphical view of data in a tabular format further including operating the processor to receive second user signal data from the user input device indicating a column addition request to add a column to the second table image; the second user signal data further including cell contents specification data indicating a source of data for an added column and display area coordinate data indicating a requested table position in the second table; and operating the processor to respond to the column addition request from the machine user by computing new column data values for cell regions to be included in the added column using the source of data for the added column indicated by the second user signal data;

producing image definition data defining a new-column graphical display object for indirectly representing each new column data value to be displayed in each cell region in the added column; each new-column graphical display object having a value display feature representing the new column data value; a value display feature of a first graphical display object shown in the added column visually distinguishing the first graphical display object from a second graphical display object shown in the added column representing a different source data value;

presenting a third table image in the display area showing the added column including the new-column graphical display objects in the requested table position; the machine user being able to visually compare a first new column data value indirectly represented in the added column with a second new column data value indirectly represented in the added column using the graphical display objects.

19. The method of claim 18 wherein the source of data for the added column indicated by the second user signal data are a plurality of source data values indirectly represented by graphical display objects presented in second and third columns in the second table image.

20. The method of claim 15 of operating a machine to present a graphical view of data in a tabular format wherein display features of the graphical display object may be changed by a user request.

21. The method of claim 15 of operating a machine to present a graphical view of data in a tabular format wherein the source data value directly represented in a cell region in the first column in the first table image indicates quantity information; wherein each graphical display object shown in the first column of the second table image is a line segment; and wherein the value display feature of each graphical display object is the length of the line segment; the length of the line segment of a graphical display object being determined by the quantity information of the source data value directly represented in the respective paired cell region in the first column in the first table image; the first column in the second table image showing line segments of different lengths representing the source data values directly represented in the respective paired cell regions.

22. The method of claim 15 of operating a machine to present a graphical view of data in a tabular format wherein the source data value directly represented in a cell region in the first column in the first table image indicates category information indicating that the source data value is one of at least two categories of information;

wherein each graphical display object shown in the first column of the second table image is a visible display object boundary feature having an object width dimension suitable for presentation in a cell region; and wherein the value display feature of each graphical display object is an x coordinate position in the cell region determined by the category information indicated by the source data value directly represented in the respective paired cell region in the first column in the first table image; the first column in the second table image showing display object boundary features positioned at different x coordinate positions in the cell regions representing the source data values directly represented in the respective paired cell regions.

23. The method of claim 15 of operating a machine to present a graphical view of data in a tabular format wherein the value display feature representing a source data value of a respective source data item includes a visually distinguishing characteristic determined using the size dimension of the cell region; a machine user perceiving a graphical display object in a cell region in the first column of the second table image being able to compare the visually distinguishing characteristic of the value display feature to the size dimension of the cell region to estimate the source data value indicated by the respective source data item represented by the graphical display object.

24. An article of manufacture for use by a machine; the machine including input signal circuitry for receiving interaction signals from a user interaction device; output circuitry connected to a display device for presenting images thereon; storage medium access circuitry for accessing a medium that stores data; and a processor connected for receiving the input interaction signals from the user interaction device, connected for providing image definition data defining images to the output circuitry for presenting the images on the display device, and connected for receiving data from the storage medium access circuitry; the article comprising:

a data storage medium that can be accessed by the storage medium access circuitry when the article is used by the machine; and data stored in the data storage medium so that the storage medium access circuitry can provide the stored data to the processor when the article is used by the machine; the stored data comprising instruction data indicating instructions the processor can execute;

the processor, in executing the instructions, obtaining a plurality of source data items included in an n-dimensional (nD) data array stored in the memory; respective ones of the plurality of source data items in a first dimension of the nD data array each being referred to as case data items; each case data item indicating a set of source data items in a second dimension of the nD data array; each source data item included in the set of source data items in the second dimension being referred to as a variable data item and indicating variable information about the case data item; the set of variable data items for each case data item being identically ordered with respect to the variable information provided about the case data item such that a first variable data item for a first case data item indicates first variable information about the first case data item and a first variable data item for a second case data item indicates first variable information about the second case data item; each of the plurality of first variable data items indicated by respective ones of the case data items being referred to as a first column data item; each source data item stored in the nD array having a source data value indicating a direct representation of information about the respective source data item;

the processor, further in executing the instructions, determining a graphical display object for each respective first column data item; each graphical display object representing an indirect graphical representation of the source data value indicated by the respective first column data item; each graphical display object having display features in common with each other graphical display object representing a first column data item; each graphical display object further having a display feature, referred to as a value display feature, representing the source data value of a respective first column data item; a value display feature of a first graphical display object visually distinguishing the first graphical display object from a second graphical display object representing a respective first column data item having a different source data value;

the processor, further in executing the instructions, producing image definition data defining an image, referred to as a table image, for presentation in the display area; the table image defining a two-dimensional (2D) region in the display area for displaying the source data values of the plurality of source data items included in the nD array; the table image including a plurality of cell regions arranged in a two-dimensional (2D) grid of horizontally-arranged cell regions referred to as rows and vertically-arranged cell regions referred to as columns; a number of rows in the 2D grid being determined according to the respective case data items in the first dimension of the nD data array; a number of columns in the 2D grid being determined according to a number of the variable data items included in each set of variable data items in the second dimension of the nD data array; each cell region in the table image being paired with a respective source data item in the nD data array;

the processor, still further in executing the instructions, producing image definition data defining each graphical display object representing a respective one of the plurality of first column data items; each graphical display object having size dimensions suitable for presentation in a respective one of the cell regions in a first column of the table image;

the processor, still further in executing the instructions, presenting the table image in the display area and presenting the graphical display objects in respective ones of the cell regions in the first column of the table image; the table image showing in the first column indirect representations of the source data values for respectively paired first column data items; the graphical display objects shown in the first column being visually similar as a result of having display features in common with each other graphical display object; the graphical display objects shown in the first column being visually distinguishable from one another as a result of each having a value display feature representing the source data value of the respective first column data item represented by the graphical display object.

25. The article of manufacture of claim 24 wherein the value display feature representing a source data value of a respective first column data item has a relationship to a size dimension of the cell region; a visually distinguishing characteristic of the value display feature being determined using the size dimension of the cell region; a user perceiving a graphical display object in a cell region in the first column of the table image being able to compare the visually distinguishing characteristic of the value display feature to the size dimension of the cell region to estimate the source data value indicated by the respective first column data item represented by the graphical display object.

26. The article of manufacture of claim 24 wherein each source data item stored in the nD data array indicates a data type data item indicating a data type thereof; the processor, further in executing the instructions, obtaining the data type indicated by a respective first column data item; and wherein the processor, in executing the instructions for determining a graphical display object for each respective first column data item, determines a cell presentation type for each respective first column data item using the data type indicated by the first column data item; the cell presentation type being one of a plurality of cell presentation types stored in the memory of the machine each indicating a mapping from the direct representation of a source data value and a source data type indicated by a source data item to display features indicating an indirect graphical representation of the source data item; the processor using the data type obtained for the respective first column data item to obtain a matching cell presentation type stored in the memory of the machine; and uses the matching cell presentation type to determine the graphical display object representing the respective first column data item;

the graphical display objects shown in the first column of the table image being produced for presentation therein automatically using data stored in the memory of the machine.

* * * * *